US009300134B2

(12) United States Patent
Lin et al.

(10) Patent No.: US 9,300,134 B2
(45) Date of Patent: Mar. 29, 2016

(54) METHODS AND SYSTEMS FOR POWER RESTORATION PLANNING

(75) Inventors: Chenxi Lin, Norman, OK (US); Xiaosong Yang, Austin, TX (US)

(73) Assignee: ELEON ENERGY, INC., Austin, TX (US)

( * ) Notice: Subject to any disclaimer, the term of this patent is extended or adjusted under 35 U.S.C. 154(b) by 726 days.

(21) Appl. No.: 13/532,916

(22) Filed: Jun. 26, 2012

(65) Prior Publication Data

US 2013/0346057 A1    Dec. 26, 2013

(51) Int. Cl.
*G06G 7/54* (2006.01)
*H02J 3/00* (2006.01)

(52) U.S. Cl.
CPC .............. *H02J 3/00* (2013.01); *H02J 2003/001* (2013.01); *H02J 2003/007* (2013.01)

(58) Field of Classification Search
CPC ............ G06F 2217/78; G06F 17/5036; G06F 17/5022; G06F 17/5009; G09B 9/00
USPC .......................................................... 703/18
See application file for complete search history.

(56) References Cited

U.S. PATENT DOCUMENTS

2008/0133207 A1*  6/2008  Chaiquin ........................ 703/18

OTHER PUBLICATIONS

Li, Haibing, et al, A Metaheuristic for the Pickup and Delivery Problem with Time Windows, Department of Computer Science, National University of Singapore, Singapore, 11543 (8 Pages).
Pisinger, David, et al., Adaptive Large Neighborhood Search applied to mixed vehicle routing problem, NEXT workshop 2006 (5 pages).
Hansen, Pierre, et al., Variable neighborhood search: Principles and applications, European Journal of Operational Research 130 (2001) (pp. 449-467).
Gashti, Mandis Haghighi, et al., Greedy Randomized Adaptive Search Procedures for a Single Product Network Design Model, IJRRAS 6 (4), Mar. 2011 (pp. 419-423).
Pisinger, David, et al., Large neighborhood search (pp. 1-22).
Nanry, William P., et al., Solving the pickup and delivery problem with time windows using reactive tabu search, Pergamon, Transportation Research Part B 34 (2000) (pp. 107-121).

* cited by examiner

*Primary Examiner* — Saif Alhija
(74) *Attorney, Agent, or Firm* — Krueger Iselin LLP

(57) ABSTRACT

In at least some embodiments, a computer system includes a processor and a storage device coupled to the processor. The storage device stores a program that, when executed, causes the processor to simulate restoration of a power grid system and to generate a restoration plan for the power grid system based on the simulation.

19 Claims, 16 Drawing Sheets ately used by the operator for making real-time decisions. Planning presumably is to generate the best estimation of the future status of the grid based on the most updated information and the best technology available.
METHODS AND SYSTEMS FOR POWER RESTORATION PLANNING

BACKGROUND

Power system restoration becomes more important daily due to the upcoming significant amount of uncertainties and risks from integrated variable renewable energy resources, market activities and stressed power system facilities. Restoration planning is an off-line process ensuring an effective coordinated restoration following a wide-area blackout based on the best knowledge available. Due to the size and complexity of the problem, conventional planning technologies have to rely on a number of manual studies based on certain selected load scenarios, size-reduced network models and fixed generation profiles, which may not be adequate for the future smart-grid with frequent system reconfigurations, variable energy resources and responsive loads.

Planning is an integrated part of power system operation. It includes a number of offline analyses and simulations completed prior to real-time. Planning is essential to the real time operation, as the outcomes of planning not only can be used to improve the understanding about the grid status and potential problems at various time horizons in the future, some are even directly used by the operator for making real-time decisions. Planning presumably is to generate the best estimation of the future status of the grid based on the most updated information and the best technology available.

Power system restoration planning is an important undertaking, specifically aimed at helping the grid operator to be better prepared after a large-scale blackout. Because of the complexity of the power system and lack of precise information about grid status during the restoration process, although not all the restoration issues can be addressed ahead of time, planning still provides crucial support such as formulation of appropriate strategies, identification of potential transient and steady-state reliability problems along the way, assessment of the status or readiness of key restoration components, and essential trainings.

The complexity and dimensionality of the problem, incompleteness of information, and tight runtime constraints make the power system restoration one of the most challenging problems in engineering disciplinary. First, it can be seen as an optimization problem concerning resource selection, path finding, and load pickup. Furthermore, the stability of electrical power system is determined by physics and rendered as different transient and steady-state complex problems. Thus, the solutions to these problems depend on distinctively different mathematical models and methods under different assumptions. Moreover, these problems, most likely presented in large-scale and partial information, must be solved under tight runtime constraints to be practical.

Planning for power system restoration following a complete or wide-area blackout is presently more important than ever before. In the past, restoration planning wasn't a central issue to power companies as blackouts were considered very rare events. Most power companies would only conduct restoration planning a few times per year, and many plans used for guiding the restoration are currently outdated or not comprehensive. Due to the rapid growth of variable generation resources, increasing involvement of responsive loads, development of less-dispatchable distributed generation resources and more stressed grid infrastructures, the system operators are seeing ever changing problems and an urgent need to manage the increasing risk of large-scale blackouts.

Comprehensive restoration planning could be one of the most challenging issue to engineering science as it not only includes almost all difficult issues encountered in normal operation condition, many additional stability issues appeared in a weak grid, that are specifically of concern to restoration, have to be considered as well. In order to improve the effectiveness of restoration planning, more advanced tools are desired to help operators to complete the task effectively when it happens.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
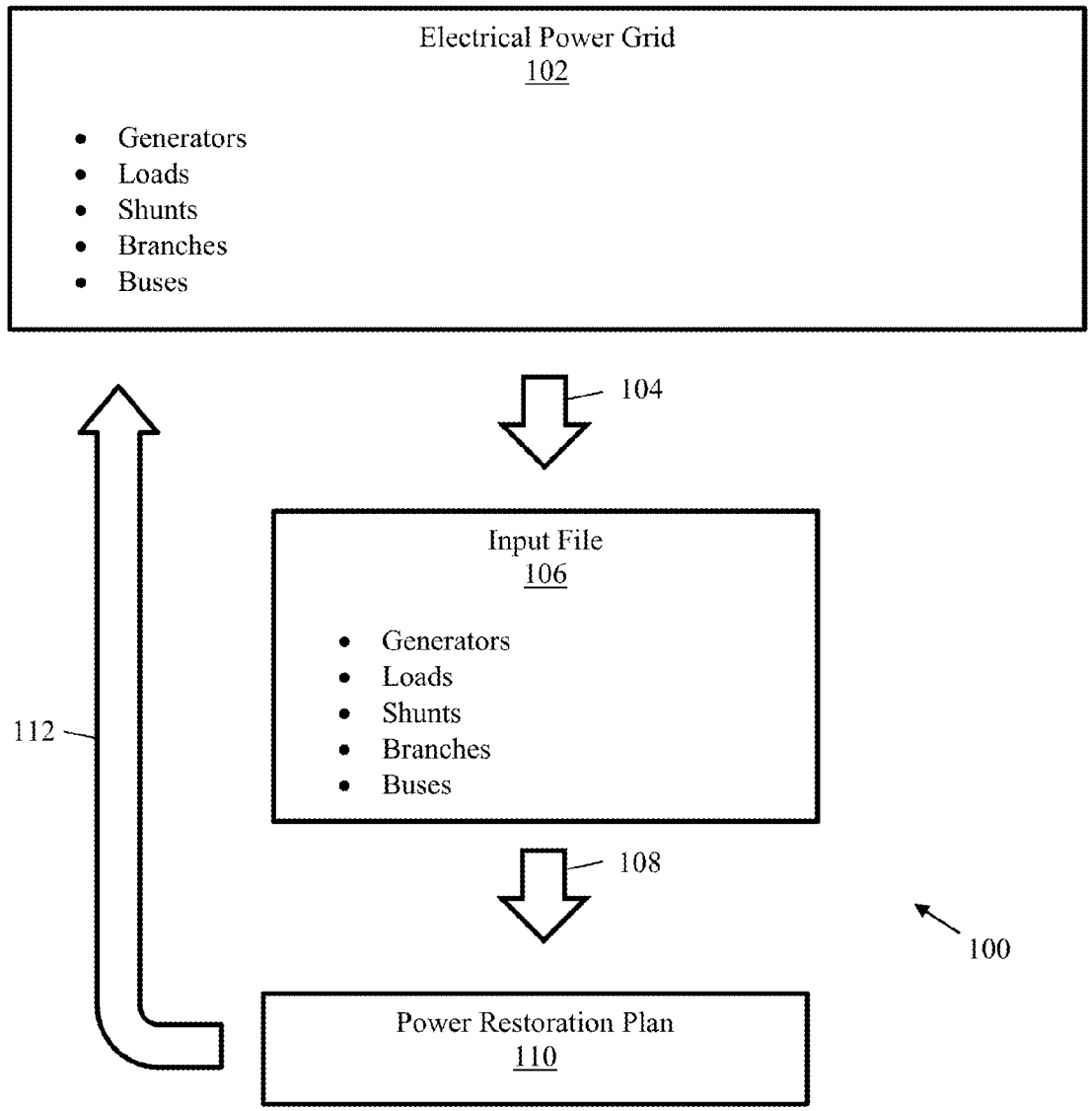
FIG. 1 illustrates a system in accordance with an embodiment of the disclosure.

Certain terms are used throughout the following description and claims to refer to particular system components. As one skilled in the art will appreciate, individuals and organizations may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to computer-based power restoration simulation and planning tools. In at least some embodiments, the power restoration simulation and planning tools are executed by one or more computers. As an example, a computer executing power restoration simulation and planning software may be part of or may be in communication with a power grid control system. Additionally or alternatively, features of power restoration simulation and planning software may be available via a website. For example, a client-server system may be provided to enable power grid control operators to download or access power restoration simulation and planning software. In some embodiments, a client computer may submit a request to a server computer. Thereafter, the server computer is able to process the request, to simulate power restoration based on information provided with the request and control algorithms, and to provide a response to the request back to the client computer.

In at least some embodiments, power restoration simulation and planning software is based on four processes: 1) sectionalization; 2) generator restoration; 3) load restoration; 4) and synchronization. Several concepts, criteria and algorithms are described herein for each of these processes to achieve different objectives. The disclosed power restoration simulation and planning techniques help system operators to efficiently create, validate and update power restoration plans.

Without limitation to other applications, the disclosed power restoration simulation and planning tools were developed to resolve pressing problems encountered during power grid restoration following a wide-area blackout. The techniques incorporate various algorithms and methodologies made possible by the recent advances in operation research and computer sciences in solving real-world network system optimization problems. These techniques are accessible through a software suite or website service to enable creation of strategic plans for generator restoration, load restoration or total system restoration. Further, the plans may be tested for feasibility analysis.

The proposed software or website tools enable power grid operators to automate various tasks for finding valid restoration plans. The disclosed tools are flexible and allow the user to modify the input of grid structures, to specify the restoration priority for generators and loads, to alter generation or load scenarios, to review parallel restoration strategies, and to choose complete or partial feasibility tests. Further, the disclosed tools may operate based on the most updated information about the power grid status. Moreover, the software or website service creates functional plans with granularity reflecting practical step-by-step operations. The displayed power restoration plans enable a rapid development of solutions with detailed instructions for restoration, and extends the operator's capacity to resolve other complex issues such as screening crucial facilities, identifying obligations and responsibilities of critical parties, or recommending remedial actions.

As an example, the disclosed tools may be applied to develop the most feasible pathway to restore power during a black out situation. As an analogy, a global positioning system (GPS) or navigation system may direct a driver that is stuck in traffic to the best or quickest way to get to a final destination. In this comparison, the power grid system operator is the driver and power outage issues correspond to the traffic.

In some embodiments, the disclosed tools enable automated power system restoration planning after large-scale or partial-scale blackout of system. Further, the disclosed tools generate successful restoration plans without violating constraints of the power grid system being simulated. As previously mentioned, power restoration simulation and planning software may be based on four processes: 1) sectionalization; 2) generator restoration; 3) load restoration; 4) and synchronization. In the sectionalization process, subsystems or sections of a power grid system are identified or created so that the restoration can be carried out in parallel. The method comprises using several criteria to determine subsystems for optimal restoration. The inputs for sectionalization are system topology, locations for all generators and loads and the total number of subsystems users need. The output of the sectionalization process may be, for example, the bus list in each subsystem.

There are two groups of generators in a power system: black-start (BS) generators and non-black-start (NBS) generators. Specifically, black-start units are those generators which are able to start up by themselves, while non-black-start generators are those units which require cranking power from outside. In the disclosed generator restoration process, the objective is to energize all NBS generators in each subsystem. The generator restoration process implements several algorithms to achieve this goal. For example, a generator start-up sequencing algorithm may be applied to obtain a restoration sequence for non-black-start generators. Further, for each NBS generator, a load identification algorithm is applied to find the suitable loads to be energized at the same sequence as generator in order to maintain power balance of the system. Further, after the suitable loads are found for each NBS generator, a path search algorithm is applied to find all possible transmission paths between the NBS generator to be energized and the suitable loads found with the load identification algorithm. Further, a path selection algorithm is applied to select the feasible and optimal path without violating constraints of system from the possible path set obtained by the path search algorithm. After the restoration plan is obtained for each NBS generator, a test algorithm is applied to test the feasibility of restoration plan. If there is no violation occurred during energizing each NBS generator, the restoration plan is considered as a successful plan. Otherwise, alternative efforts are needed to energize the generator in the next iteration. A flowchart of the generation restoration process is shown and described for FIG. 6.

After most NBS generators are energized in the subsystem, the objective of power system restoration planning is the load restoration, which means picking up loads in the subsystem to a target ratio. In at least some embodiments, the load restoration process is similar to generator restoration process and algorithms used in generator restoration process are also applied in the load restoration process by changing the inputs and outputs. The only difference is that the generator start-up sequencing algorithm in generator restoration process is replaced by the load restoration sequencing algorithm in load restoration process, which provides a load restoration sequence. A flowchart of the load restoration process is shown and described for the flowchart of FIG. 7.

The final stage of power system restoration planning is the synchronization process after generators and loads are restored in each subsystem. The objective of the synchronization process is to integrate all subsystems that are already energized after parallel restoration to an entire system by energizing the interconnection branches. Several criteria are considered to determine the sequence of merging subsystems without violating constraints of system as described herein.

In addition, a user-friendly interface style is developed that provides users lots of freedom to generate the suitable restoration plans satisfying real time requirements of system operators, such as availability of generator/load/branch, important generators or loads, etc. Moreover, the input file of the invention is a case file by standard industry description of a power system including five types of devices: bus, generator, load, shunt (capacitor and inductor) and branch (transmission line and transformer). This standard input format is the same as those used in current major steady state power flow analysis software such as PowerWorld or PSSE.

In some embodiments, the disclosed automated power system restoration planning tools are based power restoration planning problem modeled on an undirected graph G=(N, A) where N represents the node set and A represents the arc set. The node set is defined as $N=\{n_1, \ldots, n_k\}=G \cup L \cup X$, where $G=\{g_1, \ldots, g_m\}$ is the set of generator buses, $L=\{l_1, \ldots, l_r\}$ is the set of load buses, and X is the set of other buses without any sources. BS∈G is the black-start generator bus set. The arc set is defined as $A=\{(a_1^1, a_2^1), \ldots, (a_1^q, a_2^q)\}=B \cup T$, where B represents the set of transmission lines and T represents the set of transformers.

The objective function can be formulated to maximize the number of generators in service during power system restoration periods without violating system constraints. In the disclosed algorithm, three steady-state criteria were used to validate the restoration plan. These criteria are voltage constraint, line flow constraint, and generator output constraint. Assuming the system has k total buses with m generators and q branches, the restoration problem is the solution for the following integer programming (IP) problem:

$$\max \sum_{t=1}^{T} \left\{ \sum_{i=1}^{m} u_{g_i}^t + \sum_{i=1}^{r} u_{l_i}^t + \sum_{i=1}^{q} u_{a_i}^t \right\}$$

$$\text{s.t.} \begin{cases} V_{n_j}^{min} \le V_{n_j}^t \le V_{n_j}^{max}, j=1,\ldots,k \\ S_{a_i}^t \le S_{a_i}^{max}, i=1,\ldots,q \\ P_{g_i}^{min} \le P_{g_i}^t \le P_{g_i}^{max}, i=1,\ldots,m \end{cases}$$

where $u_{g_i}^t$ $u_{l_i}^t$ and $u_{a_i}^t$ are binary decision variables denoted as the status of generator $g_i$ at time t, the status of load $l_i$, and the status of branch $a_i$. For example, $u_i^t=1$ means that generator i is energized at time t and $u_i^t=0$ means it is off at time t. This above definition also applies to $u_{l_i}^t$ and $u_{a_i}^t$, for loads and branches. $V_{n_j}^t$ is the voltage of bus $n_j$ at time t, where $V_{n_j}^{min}$ and $V_{n_j}^{max}$ represent the minimum and maximum allowable value of bus voltage respectively; $S_{a_i}^t$ is the complex power flow in branch $a_i$ at time t and $S_{a_i}^{max}$ is the corresponding power flow limit; $P_{g_i}^t$ is the real power output of generator $g_i$ at time t, where $P_{g_i}^{min}$ and $P_{g_i}^{max}$ are minimum and maximum real power outputs of generator $g_i$.

Though the power restoration planning problem (PRPP) has not drawn significant attention from operation research practitioners, due in part to the system complexity and lack of inter-discipline expertise, it closely resembles the vehicle routing and scheduling problems (VRSP) and pickup and delivery problem (PDP), which use specialized algorithms such as branch, price, and cut along with efficient lower bound schemes to reliably solve benchmark scenarios with up to 100 customers, and occasionally scenarios involving several hundred customers. However, loosely constrained instances remain challenging. For large-scale applications arising in practice, metaheuristics provide a good alternative to specialized algorithms. Large instances of VRSPs may be solved using two types of local search algorithms. Simulated annealing and Tabu search represent the first type in which "small" neighborhoods are explored at each step in an effort to improve the current solution. Large neighborhood search (LNS) is the second type which greatly expands the topological landscape. With LNS, a substantial part of the current solution is destroyed and then reconstructed at each step, thus providing a much broader search. A variable neighborhood search is also possible, where different types of neighborhoods are defined. Efforts to use LNS on VRPs and PDPs with time windows have been applied to get high quality solutions in instances with up to 500 customers. Some of these efforts are referred to as ALNS. This approach begins with an initial solution and iteratively destroys and rebuilds it by randomly choosing and applying a number of quick neighborhood search heuristics. Associated with each heuristic is a weight which determines its selection probability. At each iteration, the new solution is either accepted or rejected and the heuristic selection weights are updated according to their performance. For the PDP, a solution is destroyed by removing a number of customers from the routes using tailor-made procedures, and then reinserting them back into different routes depending on the insertion heuristics logic. One technique based on ALNS is referred to as a greedy randomized adaptive search procedure (GRASP) that uses ALNS in the improvement phase. Another technique is referred to as a Multi-start ALNS (MSALNS) framework.

FIG. 1 illustrates a system 100 in accordance with an embodiment of the disclosure. As shown, the system 100 comprises an electronic power grid 102 comprising generators, loads, shunts, branches, and/or busses. A translation step 104 is applied to prepare an input file 106 that represents the electrical power grid 102. For example, the input file 106 may comprise a list or table of generators, loads, shunts, branches, and/or busses and their respective parameters in accordance with the components of the electrical power grid 102. A power restoration simulation step 108 is then applied to the input file 106 to determine a power restoration plan 110. The power restoration plan 110 may be applied at step 112 to restore power to the electrical power grid 102. In some embodiments, the power restoration plan 110 is generated in response to a power outage. Alternatively, the power restoration plan 110 is generated before a power outage (e.g., at predetermined time intervals) for use in restoring power to the electrical power grid 102 when needed.

Figure 2:
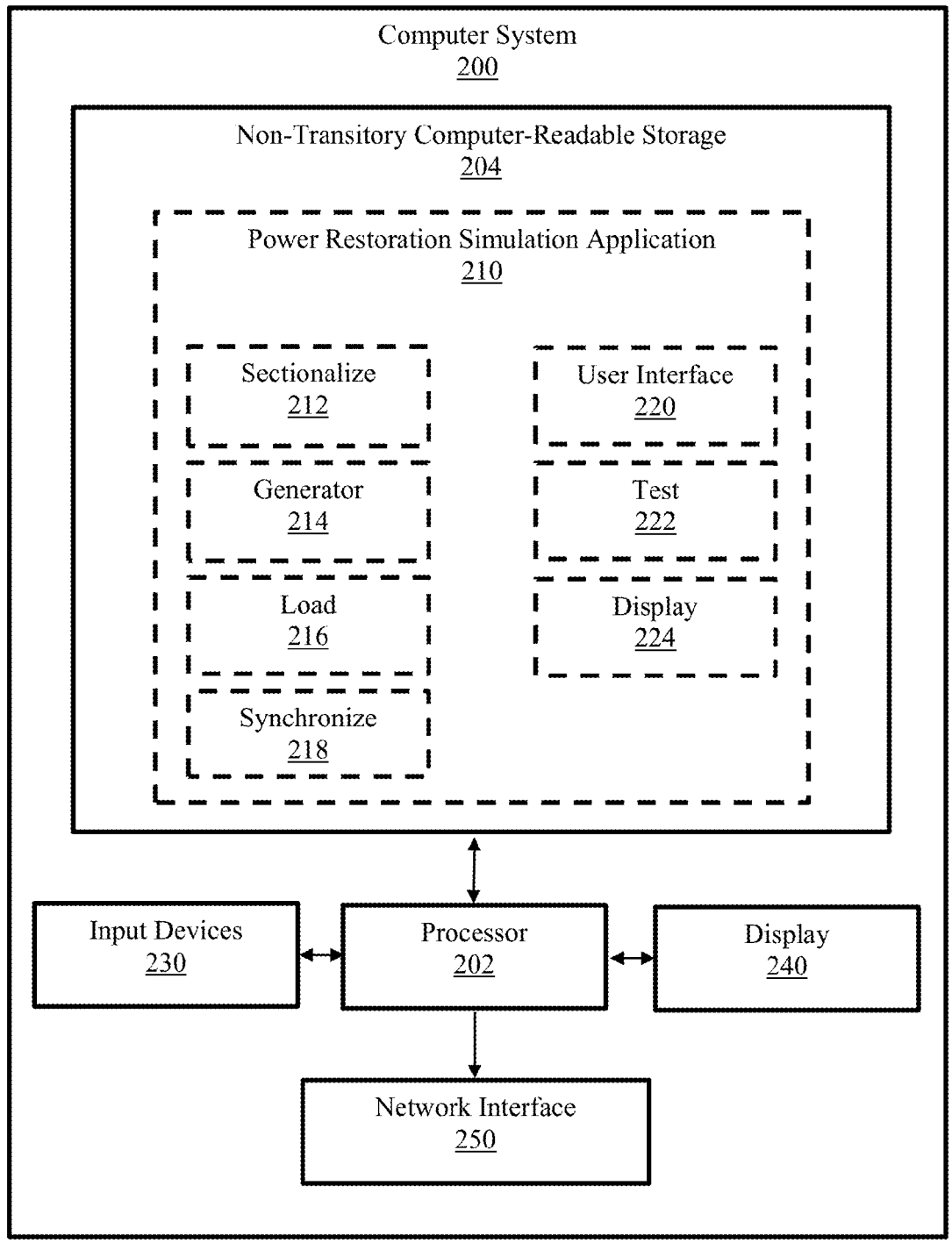
FIG. 2 illustrates a computer system in accordance with an embodiment of the disclosure.

FIG. 2 illustrates a computer system 200 in accordance with an embodiment of the disclosure. The computer system 200 may correspond to, for example, a client computer such as a mobile device, a tablet computer, a laptop computer, or a desktop computer. As shown, the computer system 200 comprises a processor 202 coupled to a non-transitory computer readable storage 204 storing a power restoration simulation application 210. The computer system 200 also comprises input devices 230, a display 240, and a network interface 250 coupled to the processor 202.

The computer system 200 is representative of a mobile device, a tablet computer, a laptop computer, or desktop computer configured to determine a power restoration plan by running the power restoration simulation application 210. Alternatively, the computer system 200 is representative of a mobile device, a tablet computer, a laptop computer, or desktop computer configured to determine a power restoration plan by communicating with a server computer that executes the power restoration simulation application 210. The processor 202 is configured to execute instructions read from the non-transitory computer readable storage 204. The processor 202 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

In some examples, the non-transitory computer readable storage 204 corresponds to random access memory (RAM), which stores programs and/or data structures during runtime of the computer system 200. For example, during runtime of the computer system 200, the non-transitory computer readable storage 204 may store the power restoration simulation application 210 for execution by the processor 202 to perform the power restoration simulation operations described herein. The power restoration simulation application 210 may be distributed to the computer system 200 via a network connection or via a local storage device corresponding to any combination of non-volatile memories such as semiconductor memory (e.g., flash memory), magnetic storage (e.g., a hard drive, tape drive, etc.), optical storage (e.g., compact disc or digital versatile disc), etc. Regardless the manner in which the power restoration simulation application 210 is distributed to the computer system 200, the code and/or data structures corresponding to the power restoration simulation 210 are loaded into the non-transitory computer readable storage 204 for execution by the processor 202.

The input devices 230 may comprise various types of input devices for selection of data or for inputting of data to the computer system 200. As an example, the input devices 230 may correspond to a touch screen, a key pad, a keyboard, a cursor controller, or other input devices.

The network interface 250 may couple to the processor 202 to enable the processor 202 to communicate with a server computer. For example, the network interface 250 may enable the computer system 200 to receive power restoration simulation services and/or to update a power restoration plan as described herein. In different embodiments, the network interface 250 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 250 may enable the processor 202 to communicate with the Internet or one or more intranets. With such a network connection, it is contemplated that the processor 202 might receive information from the network, or might output information to the network in the course of performing the call transfer features described herein. Such information, which is often represented as a sequence of instructions to be executed using processor 202, may be received from and outputted to the network, for example, in the form of a computer data signal embodied in a carrier wave.

Such information, which may include data or instructions to be executed using processor 202 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 202 executes instructions, codes, computer programs, scripts which it accesses from hard disk, floppy disk, optical disk (these various disk based systems may all be considered secondary storage), read-only memory (ROM), random access memory (RAM), the network interface 250, or the input devices 230. While only one processor 202 is shown, multiple processors may be present. Thus, while instructions may be discussed as executed by a processor, the instructions may be executed simultaneously, serially, or otherwise executed by one or multiple processors.

In accordance with at least some embodiments, the power restoration simulation application 210 comprises a sectionalize module 212, a generator module 214, a load module 216, and a synchronize module 220 to support power restoration planning as described herein. Further, the power restoration simulation application 210 comprises a user interface 220, a test module 222, and a display module 224.

The sectionalize module 212 performs the sectionalize operations described herein. The generator module 214 performs the generator restoration operations described herein. The load module 216 performs the load restoration operations described herein. The synchronize module 218 performs the synchronize operations described herein. Further, the user interface 220 enables a user to select an input file or to otherwise provide input parameters for the power restoration simulation application 210. Further, the test module 222 provides the power restoration plan testing operations described herein. The display module 224 operates to display power restoration plans or features thereof to a user. In at least some embodiments, operations of the power restoration simulation application 210 occur in response to a request from a power grid operator. Some operations of the power restoration simulation application 210 may occur before a power outage. Further, various power restoration plans specific to various criteria may be generated and accessed later as needed.

To summarize, the power restoration simulation application 210, when executed, may cause the processor 202 to simulate restoration of a power grid system and to generate a restoration plan for the power grid system based on the simulation. In some embodiments, the power restoration simulation application 210, when executed, may cause the processor 202 to simulate restoration of the power grid system by sectionalizing the power grid system and restoring power to sections of the power grid system in parallel. The power restoration simulation application 210, when executed, may cause the processor 202 to perform the sectionalizing based on a system topology, generator locations, load locations, and a total number of requested sections, where the sectionalizing results in a bus list for each section of the power grid system. Further, the power restoration simulation application 210, when executed, may cause the processor 202 to simulate restoration of the power grid system by synchronizing restoration of power to sections of the power grid system.

Further, the power restoration simulation application 210, when executed, may cause the processor 202 to simulate generator restoration for the power grid system based on a non-black-start (NBS) generator start-up sequencing algorithm. Further, the power restoration simulation application 210, when executed, may cause the processor 202 to simulate load restoration for each NBS generator of the power grid system based on a load identification algorithm and a sequence number for each of the NBS generators. Further, the power restoration simulation application 210, when executed, may cause the processor 202 to simulate restoration of the power grid system by determining all possible transmission paths between an NBS generator to be energized and corresponding loads identified by the load identification algorithm, and selecting one of the possible transmission paths. Further, the power restoration simulation application 210, when executed, may cause the processor 202 to test the restoration plan and, if the restoration plan is feasible, to display the restoration plan. Further, the power restoration simulation application 210, when executed, may cause the processor 202 to simulate restoration of the power grid system based on an input file that defines a set of busses, generators, loads, shunts, and branches.

Figure 3:
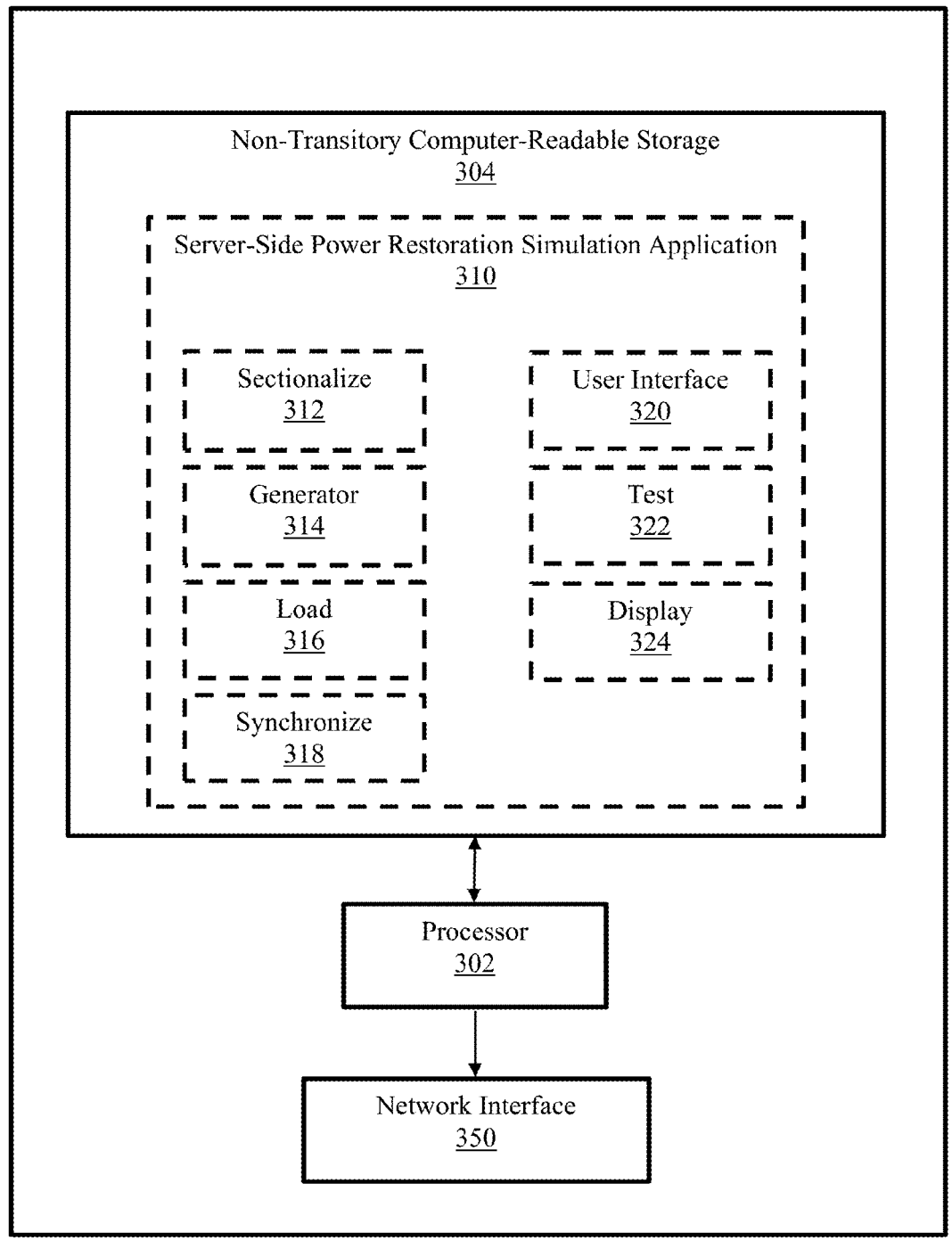
FIG. 3 illustrates a server in accordance with an embodiment of the disclosure.

FIG. 3 shows a server 300 in accordance with an embodiment of the disclosure. The server 300 may provide the power restoration simulation, test, and display operations described herein. As shown, the server 300 comprises a processor 302 and a non-transitory computer-readable storage 304 that stores a server-side power restoration simulation application 310. The processor 302 also couples to a network interface 350 that enables network communications as described herein. In accordance with at least some embodiments, the server-side power restoration simulation application 310 comprises a sectionalize module 312, a generator module 314, a load module 316, and a synchronize module 320 to support power restoration planning as described herein. Further, the power restoration simulation application 310 comprises a user interface 320, a test module 322, and a display module 324.

The sectionalize module 312 performs the sectionalize operations described herein. The generator module performs the generator restoration operations described herein. The load module 316 performs the load restoration operations described herein. The synchronize module 318 performs the synchronize operations described herein. Further, the user interface 320 enables a user to select an input file or to otherwise provide input parameters for the power restoration simulation application 310. Further, the test module 322 provides the power restoration plan testing operations described herein. The display module 324 operates to display power restoration plans or features thereof to a user. In accordance with some embodiments, the operations of the server-side power restoration simulation application 310 occur in response to a request from a client. Alternatively, some operations of the server-side power restoration simulation application 310 may occur before a request from a client. Further, various power restoration plans specific to various criteria may be stored and recalled as needed.

Figure 4:
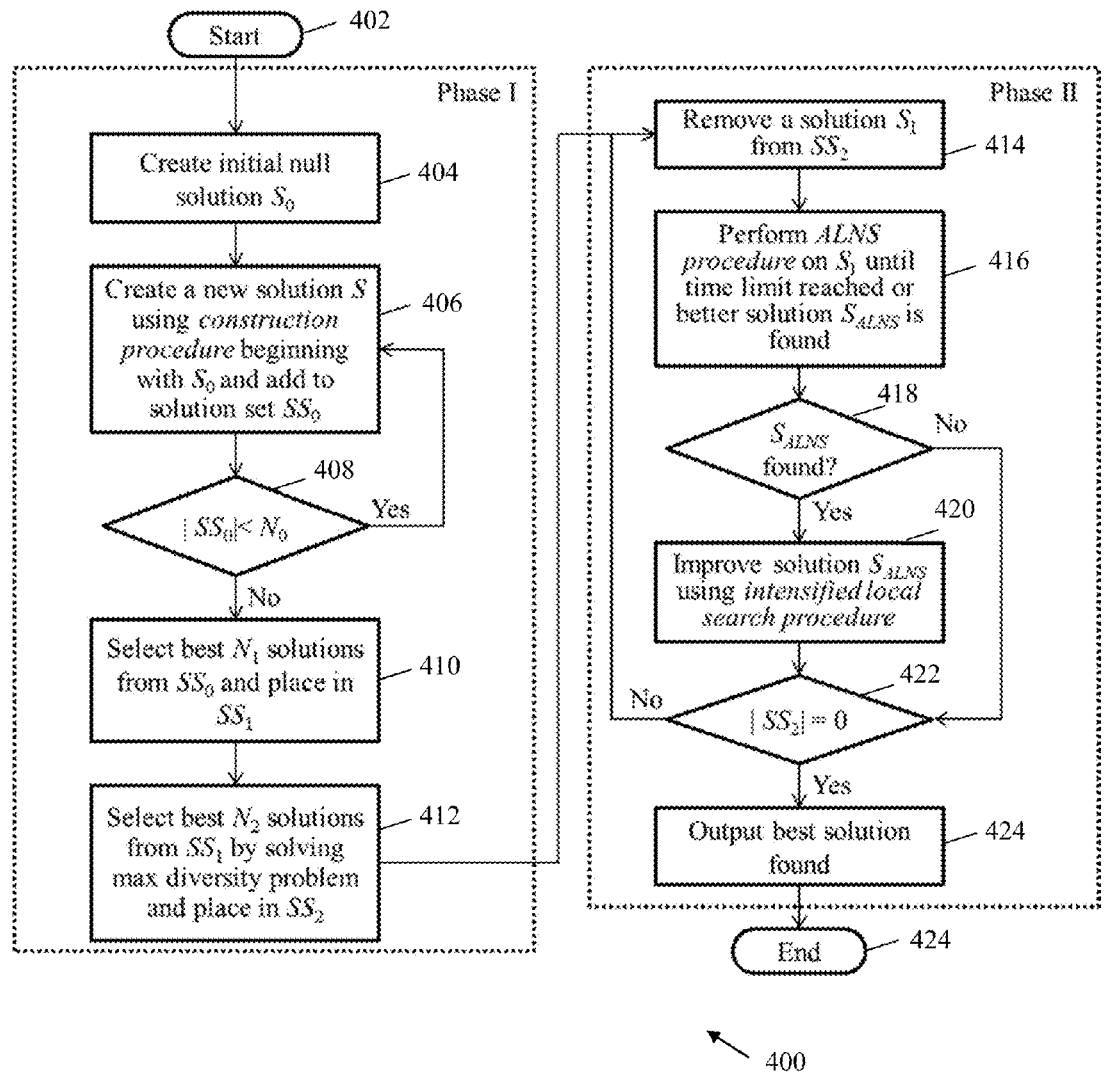
FIG. 4 shows a flowchart for the metaheuristic power restoration planning in accordance with an embodiment of the disclosure.

FIG. 4 shows a flowchart 400 for metaheuristic power restoration planning 400 in accordance with an embodiment of the disclosure. In accordance with at least some embodiments, a multi-start heuristic with probabilistic search is used to solve both generator and load restoration planning. Generator restoration and load restoration planning can both be solved under unified metaheuristics. As such, the heuristic is described in a systematic and intelligent fashion which can be applied to both planning phases and specific information for generator or load restoration is provided only when necessary. More specifically, the proposed metaheuristics may take a two-phased approach containing three major components: a randomized construction procedure, an ALNS procedure, and a local search centered on neighborhood reinsertion.

As shown, the flowchart 400 starts at block 402 and proceeds to phase I, where a predefined number $N_0$ of initial solutions are constructed from scratch (blocks 404, 406, and 408). The best $N_1$ solutions are fed to a max diversity problem, which filters the number down to $N_2$ (blocks 410 and 412). In phase II, each $N_2$ solution is improved by ALNS until a predefined runtime or iteration limit is reached (blocks 414, 416, and 418). The resulting solution is then further improved through an intensified local neighborhood search (ILS) (blocks 420, 422, and 424).

The main purpose of phase I is to find a high quality feasible solution set $SS_2$ to be locally optimized in phase II. These solutions should not have a low objective function value but should be widely distributed over the feasible region. A high degree of diversity improves the chance that the global optimum will be found during phase II.

The construction procedure is used to produce a set of initial solutions, $SS_0$. Starting with a null solution $S_0 = \emptyset$, the procedure restores generators or loads iteratively. Given a partial solution S at some iteration, one generator or load is selected from an ordered list OL determined by a generator start-up sequencing algorithm or a load restoration sequencing algorithm. Letting p be a predefined number to gauge the random effect, a random number rand is first generated in [0, 1) and the $\lfloor \text{rand}^p |OL| \rfloor^{th}$ element on OL is selected to insert. If p=0, then the node is randomly selected from OL. If p=∞, then the first element in OL is always chosen. In normal situations, p can be an integer less than 10. In generation restoration planning, the goal is to determine a set of loads required to balance a given generator to be energized. A load search algorithm is used to achieve this purpose. In the following steps, both generator restoration and load restoration take a similar approach. Given loads and generators, the path search algorithm finds the best candidate paths to connect generators and loads. Valid paths are selected from these candidate paths according to the path selection algorithm, and are further examined by the test algorithm for whole system validity.

Each solution in $SS_2$ is improved with an iterative approach using a "ruin and recreate" paradigm. Given an incumbent solution S, μ nodes are removed from restoration sequence and placed in the set U(S) at each iteration, where μ is a predefined parameter. The randomized construction procedure outlined in FIG. 4 is then use to reinsert the nodes of U(S) into the restoration plan. If the resulting solution has a lower cost than the incumbent, then the incumbent is replaced with the new solution. This process is repeated until a predefined number of iterations $N_{II}^{max}$ or time limit $T_{II}^{max}$ is reached. To remove nodes from a solution, ALNS randomly selects a removal heuristic rh from the set $\{rh_1, \ldots, rh_{nr}\}$ and applies it μ times.

The solution provided is further improved with ILS. Given an incumbent, ILS examines the reinsertion neighborhood of each node until a better solution is found or it determines that none exist. If a better solution is found, the incumbent is updated and the process is repeated. To explore the reinsertion neighborhood of a solution, ILS loops through all nodes, removing each one from its current position and attempting to reinsert it elsewhere in same restoration sequence. Unlike ALNS, ILS searches the neighborhood exhaustively such that it better serves as an intensification mechanism. However, as ILS is time consuming, it is only applied to the final ALNS solution. In at least some embodiments, the pseudocode for an ALNS procedure is as follows:

---

Procedure Search

---

Input: Phase I solution $S_I$, time out period $T_{II}^{max}$, max number of iterations
$N_{II}^{max}$, number of nodes to be removed μ, removal heuristics
$\{rh_1, \ldots, rh_{nr}\}$, insertion heuristics $\{ih_1, \ldots, ih_{ni}\}$.
Output: Best solution found S.
Step 0: Initialization
Set $S = S_I$, run time $T_{run} = 0$, iteration count iter = 0;
Set number of nodes to be removed at each iteration to μ;
Set initial values of removal heuristics weights $\{rw_1, \ldots, rw_{nr}\}$;
Set initial value of insertion heuristics weights $\{iw_1, \ldots, iw_{ni}\}$;
Step 1: Set $S_{tmp} = S$;
Step 2: Randomly select a removal heuristic $rh_i$ based on their corresponding weights and remove μ nodes from sequence of $S_{tmp}$; place removed nodes in $U(S_{tmp})$;

-continued

Procedure Search

Step 3: Set $S_{tmp}$ = Randomized_Construction($S_{tmp}$, {$ih_1$, ..., $ih_{ni}$}, {$iw_1$, ..., $iw_{ni}$});
Step 4: If (COST($S_{tmp}$) < COST(S)), then set S = $S_{tmp}$; Go to Step 1; //intensification
Update {$rw_1$, ..., $rw_{nr}$}, {$iw_1$, ..., $iw_{ni}$}, μ;
Update $T_{run}$ and put iter ← iter + 1;
If ($T_{run} > T_{II}^{max}$ or iter > $N_{II}^{max}$), then
set S = Reinsertion_LS(S);
return S;
Go to Step 2;

Meanwhile, in at least some embodiments, the pseudocode for an RILS procedure is as follows:

Procedure:  Reinsertion_LS
Input:      Initial solution $S_0$
Output:     Improved solution S
Step 0:     Set S = $S_0$;
Step 1:     For each node i in the steps of S
                Set $S_{tmp}$ = S;
                Remove node i for its position and add it to U($S_{tmp}$);
                Find best insertion $\wedge_i$ for i into the steps in $S_{tmp}$;
                If ($\wedge_i$ exists), then update $S_{tmp}$ with $\wedge_i$, remove i from U($S_{tmp}$) to get
            $S_{tmp}$ = S'($S_{tmp}$, $\wedge_i$);
                If (COST($S_{tmp}$) < COST(S)), then set S = $S_{tmp}$, go to step 1;
Step 3:     return S.

The basic metaheuristics described herein includes the following three removal heuristics.

Shaw removal heuristic ($rh_1$) tries to select nodes that are similar to each other in some sense. In doing so, there is a higher likelihood they can be reinserted into different positions to give an overall cost reduction. If the selected nodes are significantly different from each other, nearly all of the nodes would have to be reinserted into their original positions to retain feasibility, yielding no improvement. The heuristic consists of three operations: (1) a node is randomly removed from the existing sequence of solution S and placed in U(S) (2) the nodes not in U(S) are sorted using a relatedness measure $R_i$, and (3) one node is randomly selected from the sorted list using probabilities derived from $R_c$. This process is repeated until the desired number of nodes are removed.

Random removal heuristic ($rh_2$) randomly selects nodes in the plan to remove. Randomness introduces a degree of diversity that helps surmount local optima.

Random sweep heuristic ($rh_3$) randomly picks consecutive steps and removes all nodes on them. This process is repeated until additional removals result in more nodes being removed than specified by the current value of μ. The Shaw removal heuristic is then used to bring the number up to μ. By removing consecutive steps at each iteration, there is a greater probability of finding a new solution requiring fewer steps than the incumbent.

Following an iteration, the weights for each insertion and removal heuristic {$rw_1$, ..., $rw_{nr}$} and {$iw_1$, ..., $iw_{ni}$} are adaptively updated based on the quality of the new solution. The number of nodes to be removed μ is dynamically selected from the set {$\mu_1$, ..., $\mu_{ni}$} according to the number of repeated solutions in past iterations.

Given a partial solution S with inactive nodes U(S), the Greedy insertion heuristic ($ih_1$) evaluates all i∈U(S) individually to determine the best insertion positions. The list OL is constructed in ascending order of the objective improvement.

Random insertion ($ih_2$) randomly decides the order in which nodes are inserted.

Most constrained first insertion ($ih_3$) orders the nodes based on descending order of a weighted function of generator supplies and competing loads in the neighborhood. If a given generator node i has more generators and less load in the neighborhood as defined by a reachability set R(i, m), then the generator is constrained as multiple generators would compete for limited load to balance. The reachability set R(i, m) indicates that the nodes defined in graph G(N,A) can be updated by current node i in each step for all m steps. The weighted function for a generator node is defined as $Q_i$ and $-Q_i$ for a load node.

$$Q_i = \sum_{j \in GE \cap j \in R(i,m)} \beta_j P_j - \sum_{j \in L \cap j \in R(i,m)} \alpha_j W_j \quad (1)$$

In equation (1), $\beta_j$ and $\alpha_j$ are weights for each component. This logic is driven by the fact that if a node is difficult to accommodate, it should be considered first.

The insertion and removal weights of the corresponding heuristics are adaptively changed at each step based on their relative performance as the ALNS procedure progresses from one segment to the next, where a segment is a predefined number of iterations indexed by s. Within a segment, the number of times that heuristic h is used ($\gamma_h$) and its "score" ($\pi_h$), which is a qualitative measure, are tracked. At the beginning of each new segment, $\gamma_h$ and $\pi_h$ are reset to 0 for all h. At each iteration when a particular removal heuristic $rh_i$ and a particular insertion heuristic $ih_j$ are used, their counters, $\gamma_{rh_i}$ and $\gamma_{ih_j}$ are incremented by 1. If the solution obtained at that iteration is better than the incumbent solution, the scores $\pi_{rh_i}$ and $\pi_{ih_j}$ are incremented by $\delta_1$; if the solution is new but inferior to the incumbent solution, $\pi_{rh_i}$ and $\pi_{ih_j}$ are incremented by $\delta_2$. In all other cases, the scores are left unchanged. At the end of a segment, all weights are updated using the reaction factor $\rho \in (0, 1)$ which determines the rate of change according to the heuristic's performance. For segment s, the new removal heuristic weights are $rw_i^s = (1-\rho)rw_i^{s-1} + \rho \pi_{rh_i}/\gamma_{rh_i}$, i=1, 2, ..., nr, and the new insertion heuristic weights are $iw_j^s = (1-\rho)iw_j^{s-1} + \rho \pi_{ih_j}/\gamma_{ih_j}$, j=1, 2, ..., ni.

One of the ways the disclosed technique differs from previous approaches is that the number of nodes to be removed is reactively changed at each iteration. For example, the number of nodes to be removed μ is selected from a set of m numbers arrayed in ascending order: {$\mu_1$, $\mu_2$, ..., $\mu_a$, ..., $\mu_m$}. ALNS begins with the average number $\mu = \mu_a$ and μ is reset to $\mu_1$ once a better solution is found to intensify the local search; therefore only a small number of nodes are removed at each iteration. As a diversification mechanism, if the number of times all previous solutions are realized is $\lambda_1$ in a predefined number of iterations (say, $\lambda_2$), $\mu$ is set to the next highest value until $\mu=\mu_m$ is reached. If the solution uncovered at the current iteration is better than the incumbent, $\mu$ is reset to $\mu_a$ if $\mu>\mu_a$.

The general idea is if a good solution is found, the search around it should be intensified to attempt to find a local minimum. This is best achieved with a small value of $\mu$. Once it is determined that the algorithm is trapped in a neighborhood around a local minimum, the search is expanded by increasing $\mu$. The larger the value of $\mu$, the more diversified the neighborhood being searched would be. However, larger neighborhoods create longer search times per iteration, so one must to be careful in selecting $\mu_m$.

Figure 5:
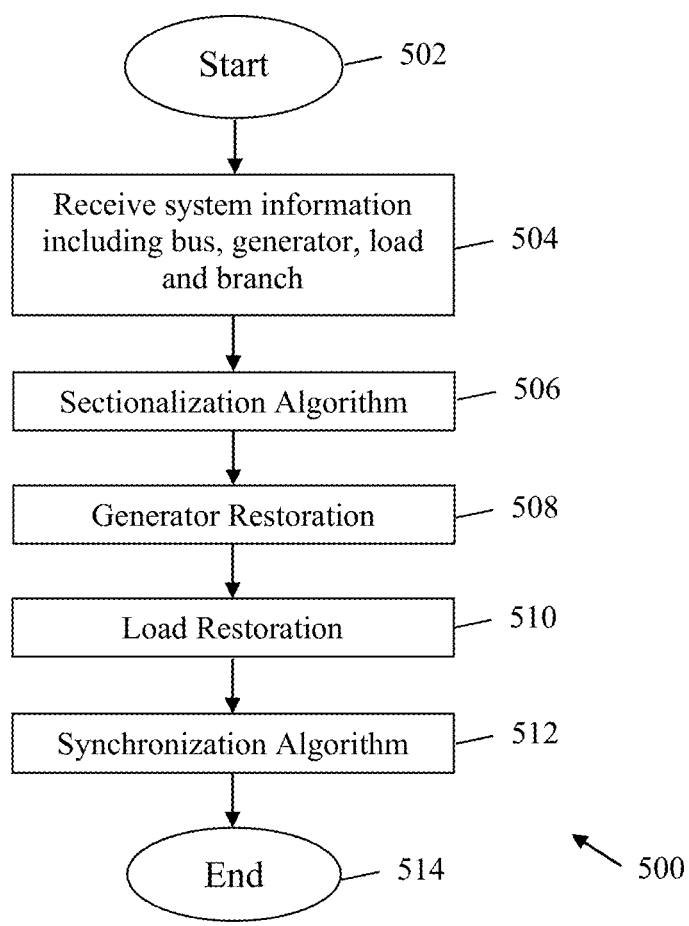
FIG. 5 shows a flowchart of a power grid system restoration simulation process in accordance with an embodiment of the disclosure.

FIG. 5 shows a flowchart 500 of a power grid system restoration simulation process in accordance with an embodiment of the disclosure. As shown, the flowchart 500 starts at block 502 and proceeds to receiving system information including bus, generator, load, and branch information (block 504). At block 506, a sectionalization algorithm is applied as described herein.

In at least some embodiments, the sectionalization algorithm performed at block 506 comprises at least some of the following description:

Sectionalization Algorithm (SEA)

Objective:

Create subsystems (islands) of original power system for parallel restoration.

Approach:

Several criteria require to be verified before the parallel restoration determination in order to maintain system security and restoration reliability. These criteria include
1) each subsystem must have at least one black-start generator;
2) each subsystem should match balance of generation and load to maintain system frequency within prescribed limits;
3) each subsystem should have adequate voltage control capabilities to maintain a suitable voltage profile; and
4) each subsystem should be monitored at the system control center to ensure its internal security In an effort to solve the problem taking into account the first two criteria above, a balanced partition (BP) problem based approach is considered. The BP problem consists of determining proper strategies to ensure that the black-start generator constraint is satisfied, and the generation/load imbalance is limited.

The BP problem can be analytical described: given an undirected, connected and node-weighted graph $G(V, E, W)$, where V is the node set, E is the branch set, and W is the weight set. A subset $E_c$ is searched for to split G into k connected sub-graph $G_1(V_1, E_1, W_1)$, $G_2(V_2, E_2, W_2)$, ... $G_k(V_k, E_k, W_k)$ such that the following constraint are satisfied:

$$\left| \sum_{v_i \in V_j} (S_G^i - S_L^i) \right| \leq \sigma \; i = 1, 2, \ldots, n \; j = 1, 2, \ldots, k$$

where $v_i$ is the node of the graph, $V_j$ is the subset of the graph, $\sigma$ is the tolerance of power balance error in each sub-graph, $S_G^i$ is the injected complex generator power and $S_L^i$ is the complex load power at bus i.

Also, since long distance transmission usually lose much energy and have stability issue such as overvoltage, distance factor should be considered in subsystem partition. In particular, a bus is better to classified in the subsystem if it is closest to the black-start units of that subsystem.

Therefore, the sectionalization algorithm is proposed as follow. Assume the original system has N black-start units $(BS_1, \ldots, BS_N)$ and need to be separated into M subsystems $(V_1, \ldots, V_M)$.

Step 1: Calculate the distance between each black-start unit $d_{ij}=d(BS_i,BS_j)$ for $i, j=1, \ldots, N$ Step 2: Classify M black-start units with the largest distance between each other into different subsystems and classify the remainder BS units in the same subsystems with the one closest to it $BS_i \rightarrow V_i, BS_j \rightarrow V_j$ if $d_{ij}>d_T$ $BS_i \rightarrow V_i, BS_j \rightarrow V_i$ if $d_{ij} \leq d_T$ Step 3: For each bus w, calculate the distance between it and other BS units and classify it in the same subsystem with the closest BS unit $$\left\{ w \in V_i \mid d(w, BS_i) = \min_j \; d(w, BS \in V_j) \text{ for } j = 1, \ldots, M \right\}$$

Step 4: Check power balance constrains in each subsystem. If a violation exists, go to Step 3 and classify the bus to the same subsystem with the second closest BS unit and repeat this procedure unit no violation occurs.

Step 5: Go to Step 3 to classify the next bus until all buses have been classified.

Returning to flowchart 500, generator restoration occurs at block 508 as described herein. As an example, a generator restoration process in accordance with embodiments is shown and described for FIG. 6. Further, at block 510, a load restoration is applied as described herein. As an example, a load restoration process in accordance with embodiments is shown and described for FIG. 7. Further, a synchronization algorithm is applied as described herein at block 512, and the flowchart 500 ends at block 514. In at least some embodiments, the synchronization algorithm performed at block 512 comprises at least some of the following description:

Synchronization Algorithm (SYA)

Objective:

Integrate all subsystems that are already energized after parallel restoration to an entire system by energizing the interconnection branches.

Approach:

Before the synchronization it is important that the differences between the voltage magnitudes, frequencies and voltage phase angles in the two subsystems are small enough. Synchronization is rather much like engaging a mechanical clutch with no slip in that the axes in the synchronous machines in the whole synchronized system will be spinning synchronously.

Several criteria are used during synchronization in order to maintain system security and restoration reliability. These criteria include:
1) select the one with the larger generation capacity as the reference bus from the reference buses of two subsystems to be connected;
2) select one which yields the minimal change of generation as the new reference bus if the two generation capacity are the same; and
3) select the one with less impact on voltage profile from all possible interconnection lines.

Figure 6:
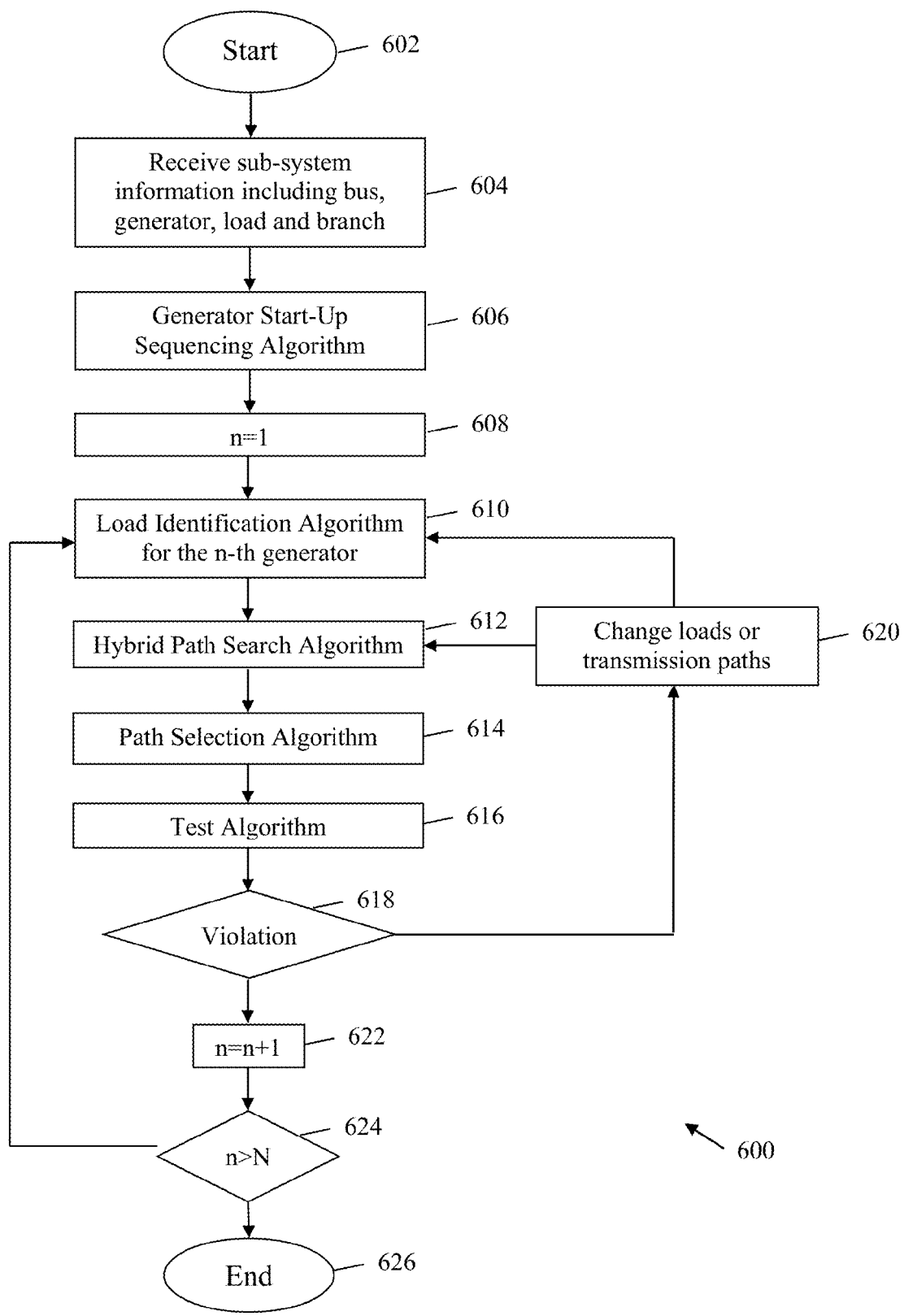
FIG. 6 shows a flowchart of a simulated generator restoration process in accordance with an embodiment of the disclosure.

FIG. 6 shows a flowchart 600 of a simulated generator restoration process in accordance with an embodiment of the disclosure. As shown, the flowchart 600 starts at block 602 and proceeds to block 604, where system information is received including bus, generator, load, and branch information. At block 606, a generator start-up sequencing algorithm is performed. In at least some embodiments, the generator start-up sequencing algorithm may correspond to at least some of the following description:

Generator Start-Up Sequencing Algorithm (GSA)
Objective:
Obtain a start-up sequence for non-black-start (NBS) generators in the subsystem
Approach:
1) Steps: generators with less steps of connection to the black-start (BS) units are prior to be energized.
Reachable matrix is used to describe whether one NBS generator can be reached by a path from a BS unit within some steps. The reachable matrix can be computed from the adjacency matrix. For a given adjacency matrix P, the reachable matrix Q at step n is derived by $$Q_1 = P$$

$$Q_n = P^n | Q_{n-1}$$

where | is logic OR operator. In power system, if the system topology is described by an adjacency matrix, the entries of a reachable matrix calculated by the above equation can be used to describe whether there exist a path connecting two buses within n steps, that is, $$[Q_n]_{ij} = \begin{cases} 1 & \text{bus } i \text{ and bus } j \text{ are connected within } n \text{ steps} \\ 0 & \text{otherwise} \end{cases}$$

Based on the reachable matrix, the steps from BS generator to all NBS generators are found. Then the NBS generators with small steps are energized earlier than NBS generators with large steps.

2) Capacity: generators with larger minimum output requirement are prior to be energized
In general, generators with larger minimum output requirement are more difficult to be energized because those generator need more loads to maintain the power balance. Therefore, for a system with limited loads, it is better to energize those generator with larger minimum output requirement in the early of sequence.

In the GSA algorithm, these two factors are considered to generate the generator start-up sequence. Specifically, an index $W_i$ is defined for each NBS generator by weighted sum of the two factors, that is, $$W_i = \alpha \overline{N_i} + (1-\alpha)\overline{C_i}$$

$$\overline{N_i} = \frac{N_i}{N_{max}}$$

$$\overline{C_i} = \frac{C_i}{C_{max}}$$

$$0 \leq \alpha \leq 1$$

where $\overline{N_i}$ is the number of steps from the nearest black-start unit to generator i after normalization, $\overline{C_i}$ is the minimum output of this generator i after normalization, $\alpha$ is the weighting factor for steps in determining the generator start-up sequence. After $W_i$ is calculated for each NBS generator, a generator start-up sequence is obtained by sorting this index. The NBS generator with the largest value of its index is restored first.

Returning to flowchart 600, n is set to 1 at block 608. At block 610, a load identification algorithm for the $n^{th}$ generator is performed. In at least some embodiments, the load identification algorithm performed at block 610 comprises at least some of the following description:

Load Identification Algorithm (LIA)
Objective:
Search suitable loads for energizing each generator to maintain power balance
Approach:
After the generator start-up sequence is obtained, a load identification algorithm is applied to each generator in the sequence. It is well known that balance between generation and load is an important factor in system restoration since it affects system frequency, that is, $$\sum_{i=1,\ldots,n} G_i = \sum_{j=1,\ldots,m} L_j$$

where $G_i$ is the real power output for generator i and $L_j$ is the real power demand for load j. If there is more load than generation connected to the grid, frequency decrease from the nominal value. In the same context, more generation than load results in a system frequency increase. Therefore, picking necessary loads and energizing generator should be synchronized in order to stabilize the power system. In this document, these necessary loads are referred to as target loads for generator restoration.

Several criteria can be used to find the target loads for generator restoration.
(1) Sum of real power demand of target loads should be equal to the output of generator to be energized in order to maintain the power balance equation. In other word, the sum of real power demand of target loads $L_j^T$ should within the output requirements of the generator $$G_i^{min} \leq \sum_{j=1,\ldots,k} L_j^T \leq G_i^{max}$$

where $G_i^{min}$ and $G_i^{max}$ are the minimum and maximum requirements of the generator i.
(2) For energizing black-start unit, small loads may be chosen as the target loads in order to assign smaller output value for BS unit so that it have more output margin to balance the power losses during system restoration.
(3) For energizing non-black-start unit, large loads may be chosen as the target loads in order to maximize the restored load when energizing generators.
(4) Using relative electrical distance (RED) to choose the target loads. The relative electrical distance is used to characterize the relative locations of load nodes with respect to the generator nodes. Assume the system has n generators and m loads, then RED is defined as $$R_{m \times n} = I_{m \times n} - |F_{m \times n}|$$

where $I_{m \times n}$ is a unit matrix with m rows and n columns and $F_{m \times n}$ is given by $$F_{m \times n} = -Y_{m \times m}^{-1} Y_{m \times n}$$

where $Y_{m \times m}$ and $Y_{m \times n}$ is the corresponding partitioned portions of admittance matrix Y. For each load node j the voltage stability index is obtained by $$I_j = \left| 1 - \sum_{i=1}^{n} F_{ji} \frac{V_i}{V_j} \right|$$

where $V_i$ is the voltage of ith generator and $V_j$ is the voltage of jth load. It can be shown that the stability limit is reached for $I_j=1$ and the stability margin of the system is obtained as the distance of the maximum I and a unit value, i.e. $\left(1 - \max_{j=1,\ldots,m} I_j\right)$.

Moreover, for power system with two generators, the voltage stability index can be rewritten using relative electrical distance as $$I_j = \left| R_{j1}\left(1 - \frac{V_2}{V_j}\right) + R_{j2}\left(1 - \frac{V_1}{V_j}\right) \right|$$

where $R_{j1}$ and $R_{j2}$ are the relative electrical distance between load j and two generators respectively. It can be easily shown that the index $I_j$ is dominated by the generator with smaller RED to load j.

Therefore, the procedure for Load Search Algorithm is described as follows.

Step 1: Using criteria (1)~(3) to choose several loads as potential target loads Step 2: Aggregate system into two generator system. One is the generator to be energized and another one is the aggregation of other energized generators called the grid equivalent generator.

Step 3: Calculate the RED between each potential target load and two generators.

Step 4: Select those loads with small RED to the grid equivalent generator as target loads.

Once target loads are found, path search algorithm is used to find the paths connected the target loads and the generator to be energized.

Returning to flowchart 600, a hybrid path search algorithm is then performed at block 612. In at least some embodiments, the hybrid path search algorithm performed at block 612 comprises at least some of the following description:

Hybrid Path Search Algorithm (HPSA)
Objective:
Find all possible transmission paths between any two buses in a power system.
Approach:
Power system network is modeled as a finite undirected graph G={B, T}. Here, B is the set of nodes (buses) T is the set of links interconnecting the nodes (branch). That is, for node u and v in B, the link $(t_u, t_v)$ is in T if u and v are directly connected in G.

Assume that each branch $(t_u, t_v)$ is associated with a weight vector $w_{u,v}=\{w_1, w_2 \ldots w_k\}$, in which $w_i$ is an individual weight component, which can be line impedance, length, etc. Accordingly, any path connected the source node and the destination node can be signed a path weight vector $w(p)=\{w_{1P}, w_{2P} \ldots w_{kP}\}$, where $w_{iP}$ equals to the sum of the corresponding weight components of all the links in the path.

An adjacency matrix is used to represent which nodes of a graph are adjacent to which other nodes. Specifically, the adjacency matrix of a finite undirected graph G on n nodes is then n×n symmetric matrix where the entries $p_{ij}$ denote whether node i and node j is connected. In a power system, each bus is viewed as a node and branch as an edge in graph, and then the adjacency matrix P for a given system is represented by:

$$[P]_{ij} = p_{ij} = \begin{cases} 1 & \text{bus } i \text{ and bus } j \text{ are connected} \\ 0 & \text{otherwise} \end{cases}$$

After the adjacency matrix is obtained, the algorithm for automated path search between the source bus (generator to be energized $g_i$) and the destination bus (target loads $L^r$) in a power system may follow one of the following algorithms:

Algorithm 1 (Depth-First Based Search):
Step 1: Starts at some source bus S
Step 2: Find (or explore) the first bus that is adjacency to S
Step 3: Repeat with this bus and explore the first bus that is adjacency to it
Step 4: When a bus is found that is the destination bus or it has no unexplored buses adjacent to it then backtrack up one level, returning to the most recent bus that it hasn't finished exploring
Step 5: Done when all children buses have been discovered and examined Algorithm 2 (Breadth-First Based Search):
Step 1: Starts at some source bus S
Step 2: Find (or explore) the first bus that is adjacency to S
Step 3: Pick each child bus of S in turn and discover the buses adjacent to that child bus
Step 5: Done when all children buses have been discovered and examined The difference between depth-first search (DFS) and breadth-first search (BFS) is simply where in the to-visit list, where the new nodes be added. In BSF, all neighbors of the nodes already visited are explored before expanding any new nodes, so the new nodes are inserted to the end of the to-visit list. In DFS, all nodes are expanded to go deeper into the graph, so the new nodes are inserted to the beginning of the to-visit list.

Alternatively, for optimization problem, the shortest path between the source node and the target node needs to be found. Using the above method to find the shortest path is inefficient since it may require many iterations. The essence of the shortest path problem is the computation $$d_{st} = \min_{p \in P^{st}} w(p)$$

where the weight of a path $p=(v_0, v_1, \ldots, v_k)$ is equal to the sum of the weights of its edges:

$$w(p) = w(v_0, v_1) + w(v_1, v_2) + \ldots + w(v_{k-1}, v_k).$$

The algorithm for solving the shortest path is problem is described as follows

---
Algorithm 3 (Dijkstra's Algorithm Based Search):
---
Dijkstra (G, W, S)
  1. d[s] ← 0
  2. for v ∈ B \ {S}
  3.   do d [v] ← ∞
  4. Q ← B
  5. while Q ≠ ∅
  6.   do u ← v s.t. d[v] = min{d[x] | x ∈ Q}
  7.     Q ← Q \ {u}
  8.     for each vertex v ∈ Q
  9.       do d[v] ← min{d[v],d[u] + W(u,v)}
--- where S is the source node and the algorithm return the shortest path from the node S to other nodes in G.

Algorithm 4 (Hybrid Path Search)

A general hybrid method for intelligent search is developed based on the above three algorithms.

It can be shown that BFS method is more efficient to search the path with less adjacent noes and Dijkstra's algorithm is better to search the long length path. Therefore, a hybrid path search method by combining Algorithms 1-3 (the depth-first based search, the breadth-first based search, the Dijkstra's Algorithm Based Search) may be used in herein. Assuming $D_T$ and $C_T$ are thresholds for path length and the number of adjacent nodes, the flow diagram for hybrid path search is shown and described for FIG. 8.

Returning to flowchart 600, a path selection algorithm is then performed at block 614. In at least some embodiments, the path selection algorithm performed at block 614 comprises at least some of the following description:

Path Selection Algorithm (PSEA)

Objective:

Select the suitable transmission path from the path set obtained by PSA without violating constraints of system Approach:

After all the possible transmission paths from the generator to the target loads are found, the path is selected without violating constraints of system. In the disclosed algorithm, a path selection approach is provided that uses power transfer distribution factors (PTDFs) for large-scale power systems. The PTDFs and line impedance were used to determine the suitable transmission path.

The PTDF $\rho_{ij,k}$ describes the power flow in the transmission line from bus i to bus j with respect to the injected complex power $S_k$ on bus k. It is given $$\rho_{ij,k} = \left( \frac{(Z_{bus})_{ik} - (Z_{bus})_{jk}}{z_{ij}} \right)^*,$$

where * denotes the complex conjugate, $Z_{bus}$ is the bus impedance matrix referenced to the swing bus, $z_{ij}$ is the primitive impedance of the transmission line connecting bus i to bus j. Therefore, the variation of power plow in the transmission line l is given by $$\Delta S_l = \sum_{k=1}^{n} \rho_{l,k} \times \Delta S_k,$$

where $\Delta S_l$ is the power flow change in line l and $\Delta S_k$ is the power injection change at bus k, n is total bus number in the system. Using this equation, power flow change in each line caused by closing the candidate transmission paths can be calculated and the path without violating constraints of any line can be found. Specifically, assume there are totally m transmission lines $(l_1, \ldots, l_m)$ in the system and the selected path with k lines $(l_{m_1}, \ldots, l_{m_k})$ should satisfy the power flow limit for all lines $\{(l_{m_1}, \ldots, l_{m_k}) | S_{l_i} + \Delta S_{l_i} \leq S_{l_i}^{max}, i=1, \ldots, m\}$ where $S_1$ is the power flow in line $l_i$ before the generator is energized and $S_{l_i}^{max}$ is the power flow limit in line $l_i$. The output of the generator to be energized is assigned to be equal to the sum of target load outputs. Therefore, during each generator restoration, it is assumed that only the power injection changes at the generator bus and target loads bus. In some cases, there may be several possible paths found from which one needs to be selected. Accordingly, a randomized path selection algorithm may be applied based on the total line impedance of the path. Assume N possible paths and each path has $m_k$ lines and the algorithm is described as follows:

Step 1: Calculate the total line impedance for each possible path i $$Z_{total}^i = \sum_{j=1}^{k} Z(l_{m_j}^i) \; i = 1, \ldots, N$$

Step 2: Sort the paths by their total line impedance in an ascending order.

Step 3: Generate a random variable x from an discrete exponential distribution in $\{1, \ldots, N\}$ $$x = \left\lfloor \frac{-\ln(1-u)}{\lambda} N \right\rfloor$$

where u is a random variable with uniform distribution on (0,1); λ is the rate parameter in an exponential distribution; $\lfloor \bullet \rfloor$ is the floor function mapping a real number to the next smallest integer.

Step 4: Choose the x-th path as the selected path.

The advantage of using the randomized algorithm in path selection is that we can repeat the path selection algorithm until a feasible path is found without any violation.

Returning to flowchart 600, a test algorithm is then performed at block 616. In at least some embodiments, the path selection algorithm performed at block 616 comprises at least some of the following description:

Test Algorithm (TA)

Objective:

Test the validation of the restoration plan

Approach:

After the restoration plan is obtained, then the test algorithm is used to solve power flow of the system by operating every sequence in the plan. Three criteria may be used for the test algorithm to test the validation of a power restoration plan.

Criteria:

1. Voltage constraint: In order to obtain satisfactory system operation, bus voltages should be kept within a certain range $$V_{min} \leq V \leq V_{max}$$

where $V_{min}$ and $V_{max}$ represent the minimal and maximal allowable value of bus voltage respectively; $V_i$ is the voltage of bus i.

2. Line flow constraint: During system restoration, power flow in each branch should be under its maximum line flow limit, that is $$S_l = \sqrt{P_l^2 + Q_l^2} \leq S_l^{max}$$

where $S_l$ is the complex power flow in branch l, $P_l$ and $Q_l$ are the active and reactive power respectively, $S_l^{max}$ is the corresponding power flow limits.

3. Generator output constraint: All generators are subjected to power output requirement constraints, which means their outputs should stay in a feasible range $$P_{g,i}^{min} \leq P_{g,i} \leq P_{g,i}^{max}$$

$$Q_{g,i}^{min} \leq Q_{g,i} \leq Q_{g,i}^{max}$$

where $P_{g,i}$ and $Q_{g,i}$ are real and reactive power output of generator i, $P_{g,i}^{min}$ and $P_{g,i}^{max}$ are minimum and maximum real power output of generator i, $Q_{g,i}^{min}$ and $Q_{g,i}^{max}$ are minimum and maximum reactive power output of generator i.

A restoration plan is considered as a successful plan only if no violation occurs at each sequence of operation. Also, if a plan is found to be unsuccessful, all types of errors will be reported in the output file.

Returning to flowchart 600, if a violation of the test algorithm occurs (determination block 618), loads or transmission paths are changed at block 620, and steps 610, 612, 614, and 616, and 618 are repeated until a violation does not occur. Thereafter, the value n becomes n+1 at block 622. If n>N (determination block 624), the flowchart 600 returns to step 610. Otherwise, the flowchart 600 ends at block 626.

The flowchart 600 of FIG. 6 may correspond to a procedure Randomized_Construction_Generator_Restoration described in pseudo code as follows:

```
Input: Initial null solution S₀
Output:    New solution S with the generator restoration plan
Step 0: Initialize system information Sys.
Step 1: Call Generator Start-Up Sequencing Algorithm GSA (G, α)
    α is a weighting factor
    Output of GSA is a sequence OL to indicate the priority order of generator
        restoration
Step 2: While (|OL| > 0)
        Generate random number rand ∈ [0, 1);
        Select the next generator gᵢ = OL[⌊randᵖ |OL|⌋ ] ;
        Call Load Identification Algorithm LIA (G, gᵢ, h, Z_L)
    gᵢ: generator to be energized, h: maximum search steps, Z_L: load search
        constraints
    Output of LSA is Lᵗ which is the target loads for energizing gᵢ
        Call Path Search Algorithm PSA (G, gᵢ, Lᵗ, Z_T)
    gᵢ: generator to be energized, Lᵗ: the target loads obtained by LSA,
        Z_T: path search constraints
    Outputs of PSA are Tᵃˡˡ which are all possible paths connecting from gᵢ
and Lᵗ.
        Call Path Selection Algorithm PSEA (G, Tᵃˡˡ, PTDF, X)
    PTDF: power transfer distribution factors, X: impedance matrix
    Output of PSEA is Tˢ which is the selected path to be restored for
energizing gᵢ
        Call Test Algorithm TA (Sys, gᵢ, Tˢ, Lᵗ)
Sys: system information including generators, loads and branches, gᵢ:
    generator to be energized, Tˢ: selected branches to be closed for
    energizing gᵢ, Lᵗ: target loads for energizing gᵢ.
Output of TA is F=1: generator gi is restored successfully, F=0: violation
    occurred during restoration.
    If F=1 do:
        Update the system information Sys
        i=i+1
    else do:
        Update the load search constraints Z_L and path search
            constraints Z_T for the next iteration.
Step 3: A successful generator restoration plan is obtained.
```

Figure 7:
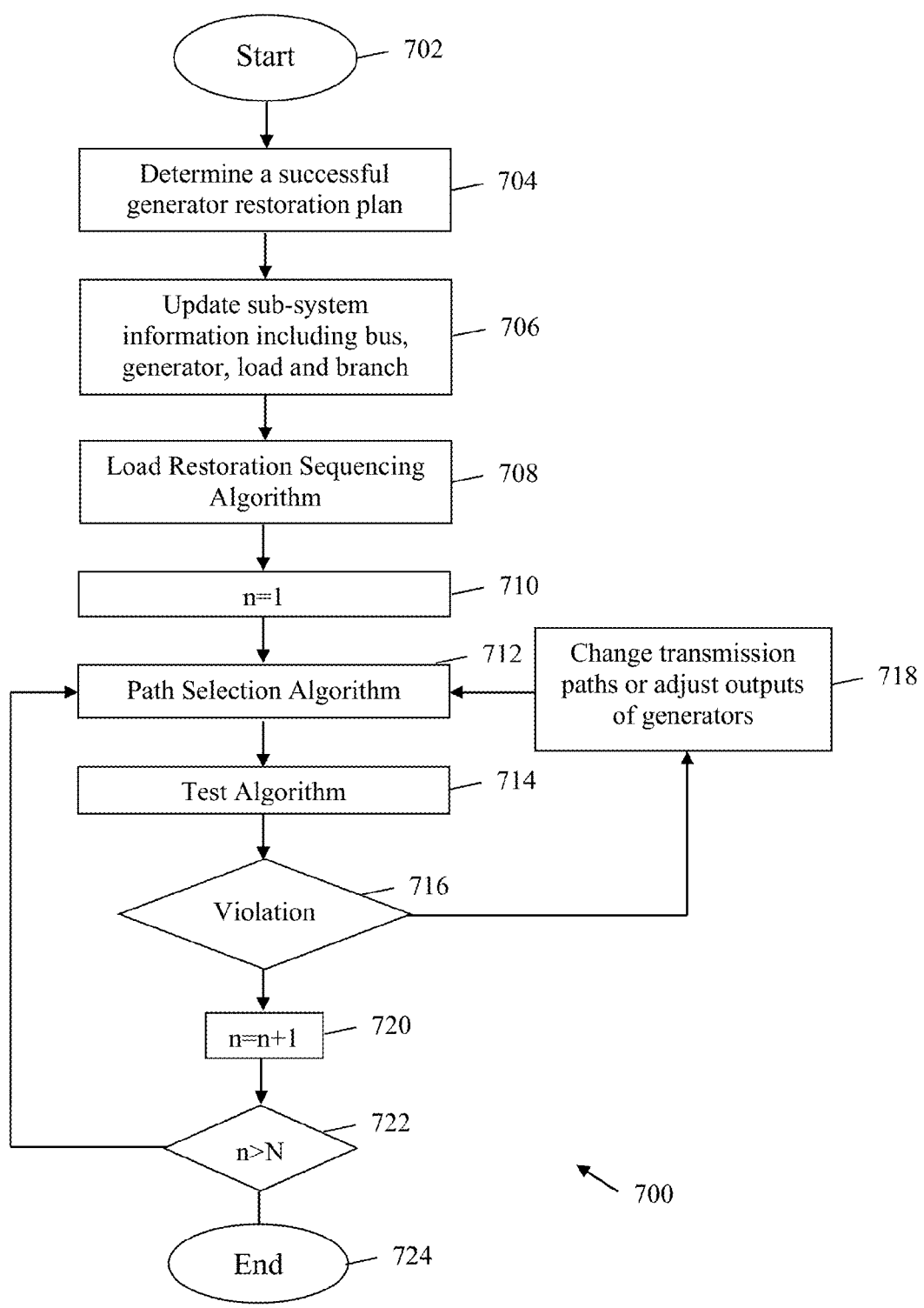
FIG. 7 shows a flowchart of a simulated load restoration simulation process in accordance with an embodiment of the disclosure.

FIG. 7 shows a flowchart 700 of a load restoration simulation process in accordance with an embodiment of the disclosure. As shown, the flowchart 700 starts at block 702 and proceeds to block 704, where a successful generator restoration plan is determined. At block 706, sub-system information is updated including bus, generator, load, and branch information. At block 708, a load restoration sequencing algorithm is applied. In at least some embodiments, the load restoration sequencing algorithm corresponds to at least some of the following description:

Load Restoration Sequencing Algorithm (LRSA)

Objective:

Obtain a restoration sequence for loads after generator restoration is finished.

Approach:

1) Priority: Important loads are prior to be restored
    Important loads such as hospital, military and government are considered to be restored as soon as possible in load restoration.
2) Size: Large loads are prior to be restored
    The goal of load restoration is to restore loads until a target ratio is met. Therefore, it is efficient to restore large loads earlier.
3) Distance: Loads close to restored area are prior to be restored Loads are restored by energizing transmission lines from those restored buses. Since long distance power transmission will lose much energy and have some stability issue, it is better to start load restoration around energized area. Similar to generator start-up sequencing algorithm, these three factors are considered together to generate the load restoration sequence. Specifically, an index $W_i$ is defined for each load by weighted sum of these three factors, that is, $$W_i = \alpha_1 \gamma_i + \alpha_2 \overline{L_i} + \alpha_3 \overline{D_i}$$

$$\overline{L_i} = \frac{L_i}{L_{max}}$$

$$\overline{D_i} = \frac{D_i}{D_{max}}$$

$$\alpha_1 + \alpha_2 + \alpha_3 = 1$$

$$0 \leq \gamma_i \leq 1$$

$$0 \leq \alpha_1, \alpha_2, \alpha_3 \leq 1$$

where $\overline{L_i}$ is the real power demand of load i after normalization, $\overline{D_i}$ is the shortest distance from this load i to a restored bus after normalization, $\gamma_i$ is denoted as the importance of load i. $\alpha_1, \alpha_2, \alpha_3$ are the weighting factor in determining the load restoration sequence. The load with the largest value of its index is restored first.

Returning to flowchart 700, n is set to 1 at block 710. At block 712, a path selection algorithm is applied to select the most suitable restoration path for loads. The path selection algorithm may be the same or similar to the path selection algorithm described for block 614 of flowchart 600.

A test algorithm 714 is applied after the path selection algorithm of step 712. The test algorithm may be the same as or similar to the test algorithm described for block 616 of flowchart 600. If a violation of the test algorithm occurs (determination block 716), generator outputs or transmission paths are changed at block 718, and steps 712, 714, and 716 are repeated until a violation does not occur. Thereafter, the value n becomes n+1 at block 720. If n>N (determination block 722), the flowchart 700 returns to step 712. Otherwise, the flowchart 700 ends at block 724.

The flowchart 700 of FIG. 7 may correspond to a procedure Randomized_Construction_Load_Restoration described in pseudo code as follows:

| | |
|---|---|
| Procedure | Randomized_Construction_Load_Restoration |
| Input: | Initial solution $S_0$ that contains a successful generator restoration plan, Graph G |
| Output: | New solution S that contains a load restoration plan |
| Step 0: | Update the system information Sys according to $S_0$. |
| Step 1: | Call Load Restoration Sequencing Algorithm LRSA (G, Sys)<br>Output of LGSA is a sequence OL to indicate the priority order of load restoration |
| Step 2: | While (|OL| > 0)<br>  Generate random number rand $\in$ [0, 1);<br>  Select the next generator $I_i$ = OL[[rand$^p$ |OL|]];<br>  Find the nearest restored bus around load $l_i$, which is $B^t$.<br>  Call Path Search Algorithm PSA (G, $l_i$, $B^t$, $Z_T$)<br>    $l_i$: load to be restored, $B^t$: the target bus, $Z_T$: path search constraints<br>      Outputs of PSA are $T^{all}$ which are all possible paths connecting from $l_i$ and $B^t$.<br>  Call Path Selection Algorithm PSEA (G, $T^{all}$, PTDF, X)<br>    PTDF: power transfer distribution factors, X: impedance matrix<br>      Output of PSEA is $T^s$ which is the selected path to be restored for picking up $l_i$.<br>  Call Test Algorithm TA (Sys, $l_i$, $T^s$)<br>    Sys: system information, $l_i$, : load to be restored,<br>    $T^s$: selected branches to be closed for picking up $l_i$.<br>    Output of TA is F=1: load $l_i$ is restored successfully,<br>    F=0: violation occurred during restoration.<br>  If F=1 do:<br>    Update the system information Sys<br>    i=i+1<br>  else do:<br>    Update the path search constraints $Z_T$ or power output of generators in Sys for the next iteration. |
| Step 3: | A successful load restoration plan is obtained |

Figure 8:
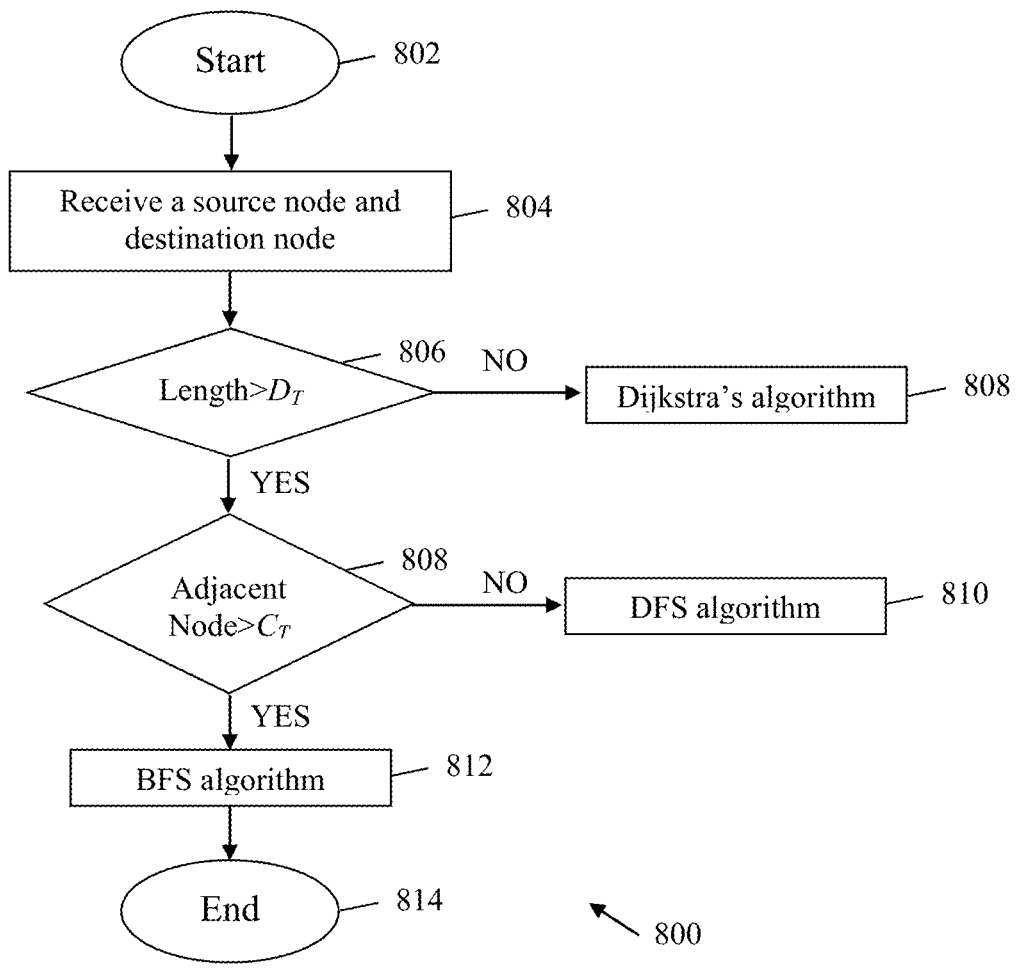
FIG. 8 shows a flowchart of a hybrid path search process in accordance with an embodiment of the disclosure.

FIG. 8 shows a flowchart 800 of a hybrid path search process in accordance with an embodiment of the disclosure. As shown, the flowchart 800 starts at block 802, and proceeds to receiving a source node and destination node at block 804. If the length between the source node and the destination node (Length) is greater than a predetermined threshold ($D_T$) (determination block 806), Dijkstra's algorithm is applied at block 808. If Length is not greater than $D_T$ (determination block 806), the flowchart 800 determines whether a number of adjacent nodes is greater than $C_T$ (determination block 808). If so, a DFS algorithm is applied at block 810. If not, a BFS algorithm is applied at block 812, and the flowchart ends at block 814.

Figure 9:
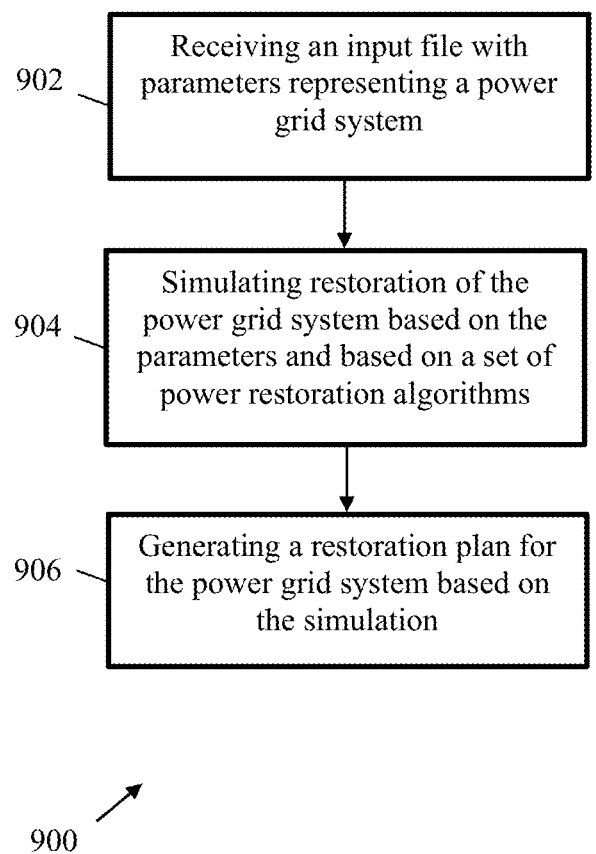
FIG. 9 shows a method in accordance with an embodiment of the disclosure.

FIG. 9 shows a method 900 in accordance with an embodiment of the disclosure. As shown, the method 900 comprises receiving an input file with parameters representing a power grid system (block 902). Restoration of the power grid system is then simulated based on the parameters and based on a set of power restoration algorithms (block 904). In some embodiments, simulating restoration of the power grid system comprises sectionalizing the power grid system into a plurality of sections based on a system topology, generator locations, load locations, and a total number of requested sections. Further, simulating restoration of the power grid system may comprise re-connecting the plurality of sections of the power grid system after they are energized. Further, simulating restoration of the power grid system may comprise applying a sequence to non-black-start (NBS) generators of the power grid system and identifying loads for each of the NBS generators. Further, simulating restoration of the power grid system may comprise determining all possible transmission paths between an NBS generator to be energized and corresponding identified loads, and selecting one of the possible transmission paths. At block 906, a restoration plan is generated for the power grid system based on the simulation. In at least some embodiments, the method 900 may comprise additional or alternative steps. For example, the method 900 may comprise testing the restoration plan and, if the restoration plan is feasible, displaying the restoration plan.

Figure 10:
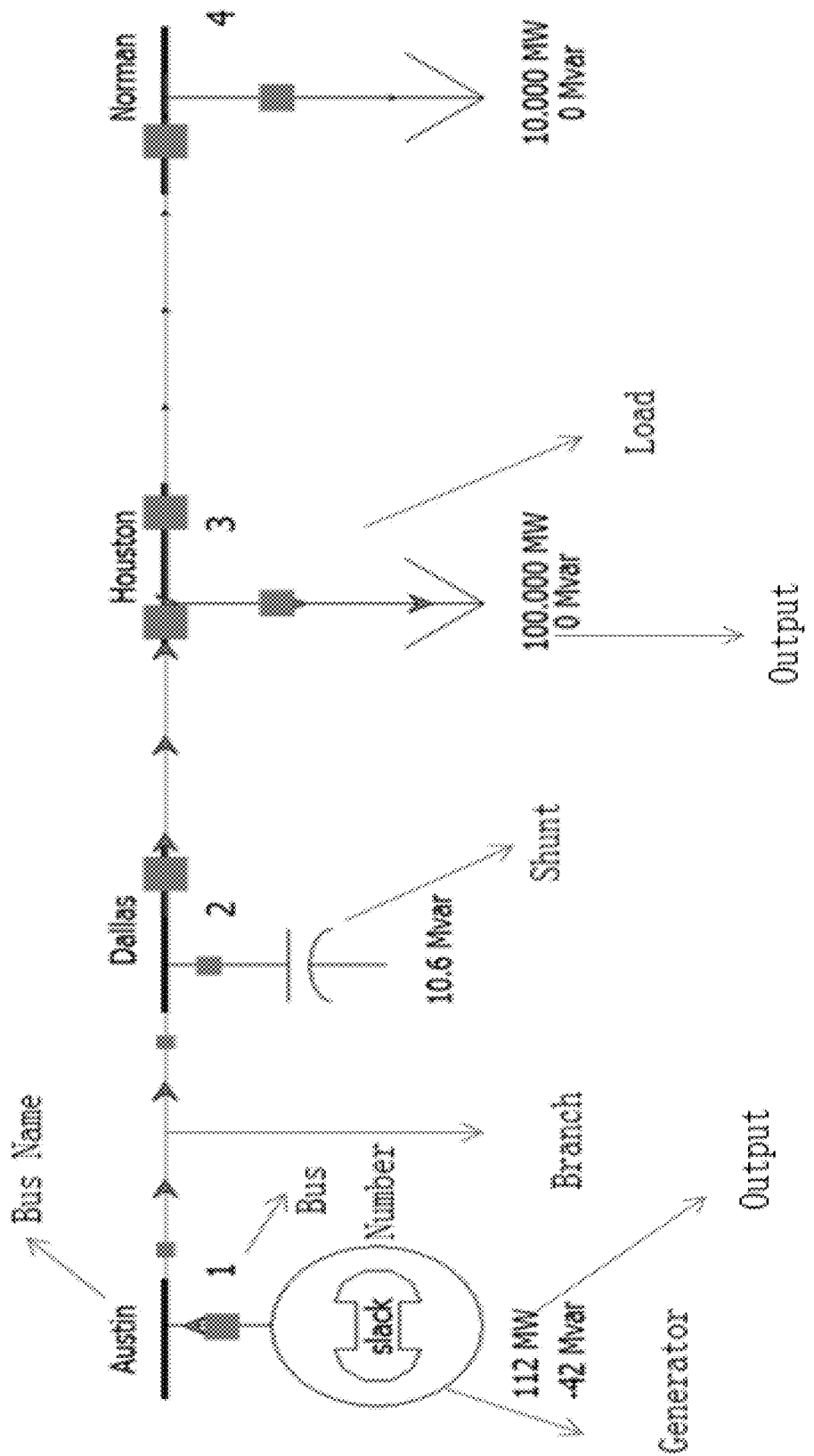
FIG. 10 shows a diagram of a power grid system in accordance with an embodiment of the disclosure.

FIG. 10 shows a diagram of a power grid system 1000 in accordance with an embodiment of the disclosure. In the power grid system 1000, there are four buses. Bus 1 is named Austin, Bus 2 is named Dallas, Bus 3 is named Houston, and Bus 4 is named Norman. Bus 1 is connected with a generator with 112 MW real power output and −42 Mvar reactive power output. Bus 2 is associated with a shunt. Bus 3 is connected with a load with 100 MW real power demand. A sample restoration plan generated by the disclosed power restoration planning application is:

| Sequence # | Bus Number | Bus Name | Object Type | Bus From | Bus To | ID | Output |
|---|---|---|---|---|---|---|---|
| 1 | 1 | Austin | Branch | 1 | 2 | 1 | |
| 2 | 2 | Dallas | Branch | 2 | 3 | 1 | |
| 3 | 3 | Houston | Branch | 3 | 4 | 1 | |
| 4 | 3 | Houston | Load | | | 1 | 100 |
| 4 | 4 | Norman | Load | | | 1 | 10 |
| 4 | 1 | Austin | Gen | | | 1 | 112 | where "sequence #" is the restoration order of objects, "bus number" is the bus number of the object, "bus name" is the bus name of the object, "object type" is one of generator/load/branch/shunt, "bus from" is the branch coming from an object, "bus to" is the branch going to an object; "ID" is the generator/load/branch ID, and "output" is the generator real power output (MW)/load real power demand (MW).

Figure 11A:
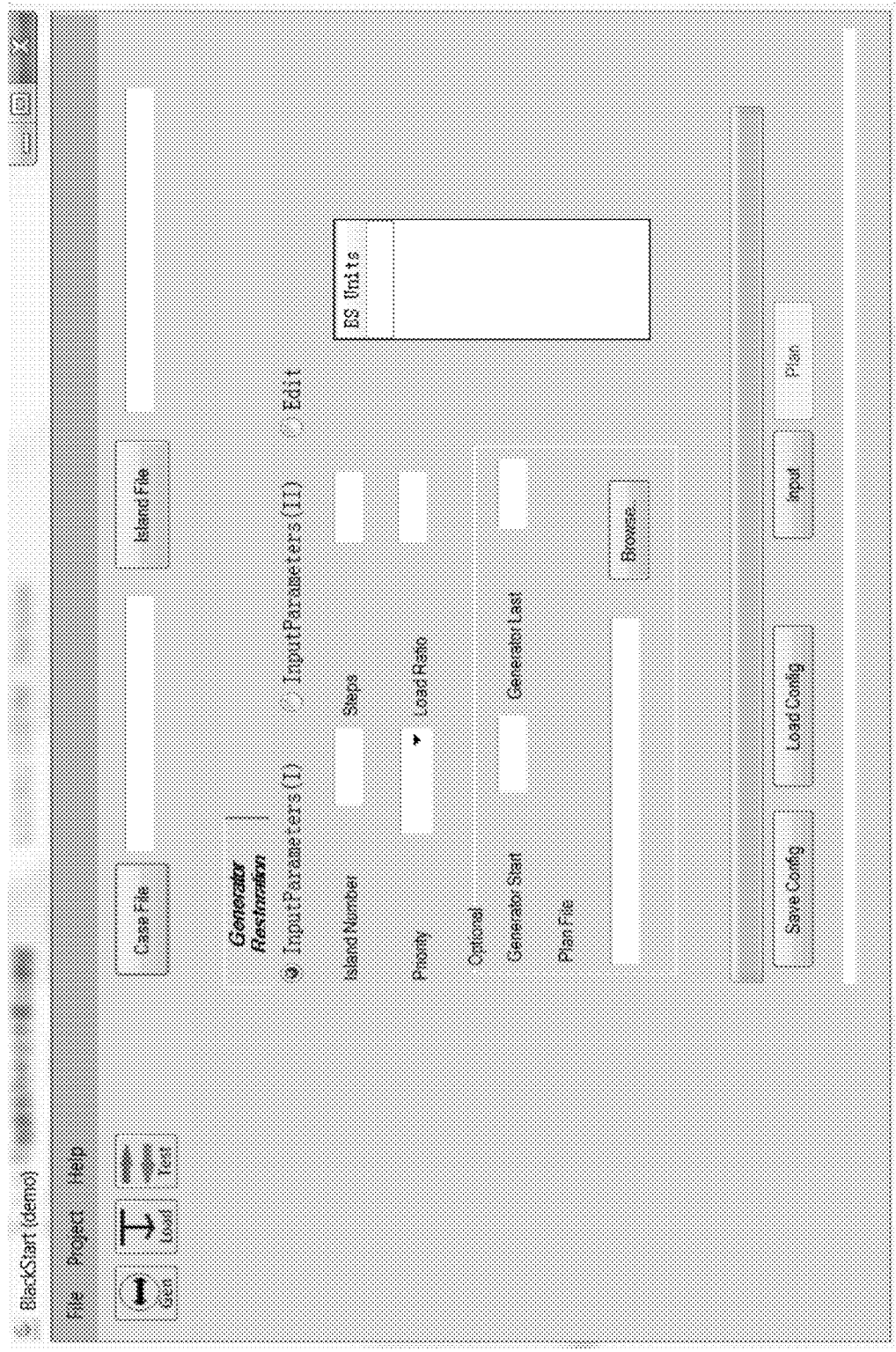
FIGS. 11A-11E show screenshots related to power restoration simulation software in accordance with an embodiment of the disclosure.

FIGS. 11A-11E show screenshots related to power restoration simulation software in accordance with an embodiment of the disclosure. In FIG. 11A, screenshot 1102 shows tabs, buttons, or entry windows to enter various input parameters for generator restoration operations of the power restoration simulation software. For example, the input parameters may correspond to the following examples:

Case File: system information including bus, generator, load and branch
Island File: bus number index in each island (subsystem) (result from sectionalization)
Island Number: the island number of the system for generator restoration
Steps: the maximum step to find loads for energizing generators in the load identification algorithm. Typical value is 5~10.
Load ratio: the ratio of peak real power demand (MW) at load buses available for generator restoration (0~1)
Priority:
  Distance: the generators near black-start units are prior to be energized
  Capacity: the generators with larger minimum output are prior to be energized
BS Units: black-start units
Plan File (optional): select an existing generator plan to be edited
Generator Start (optional): generator in the Plan File start to be edited. The existing plan before energizing this generator will remain the same in the new plan. Default value is the black-start unit.

Generator Last (optional): last generator to be energized. Default value is the last one in generator sequence provided by users or program.

Save Config (optional): save input parameters as a configure file

Load Config (optional): load a configure file

Figure 11B:
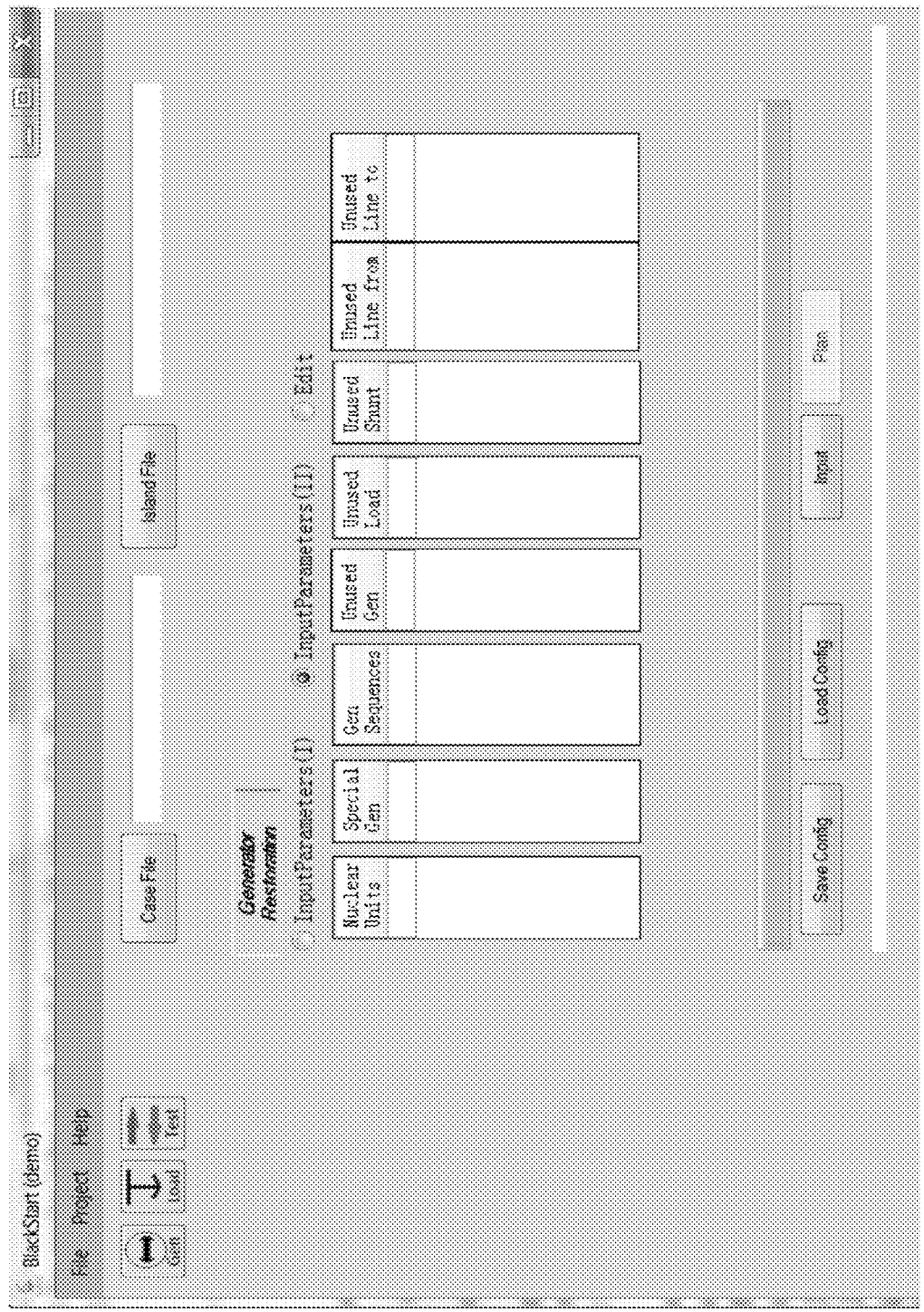

In FIG. 11B, screenshot 1104 shows tabs, buttons, or entry windows to enter various input parameters for generator restoration operations of the power restoration simulation software. For example, the input parameters may correspond to the following examples:

Nuclear Units: nuclear units

Special Units: generators to be energized at the end of plan using nearby loads

Gen Sequences: sequence of generators restoration provided by users

Unused Gen: unavailable/unused generators during generator restoration

Unused Load: unavailable/unused loads during generator restoration

Unused Shunt: unavailable/unused shunts during generator restoration

Unused Line from/to: unavailable/unused branches during generator restoration

Figure 11C:
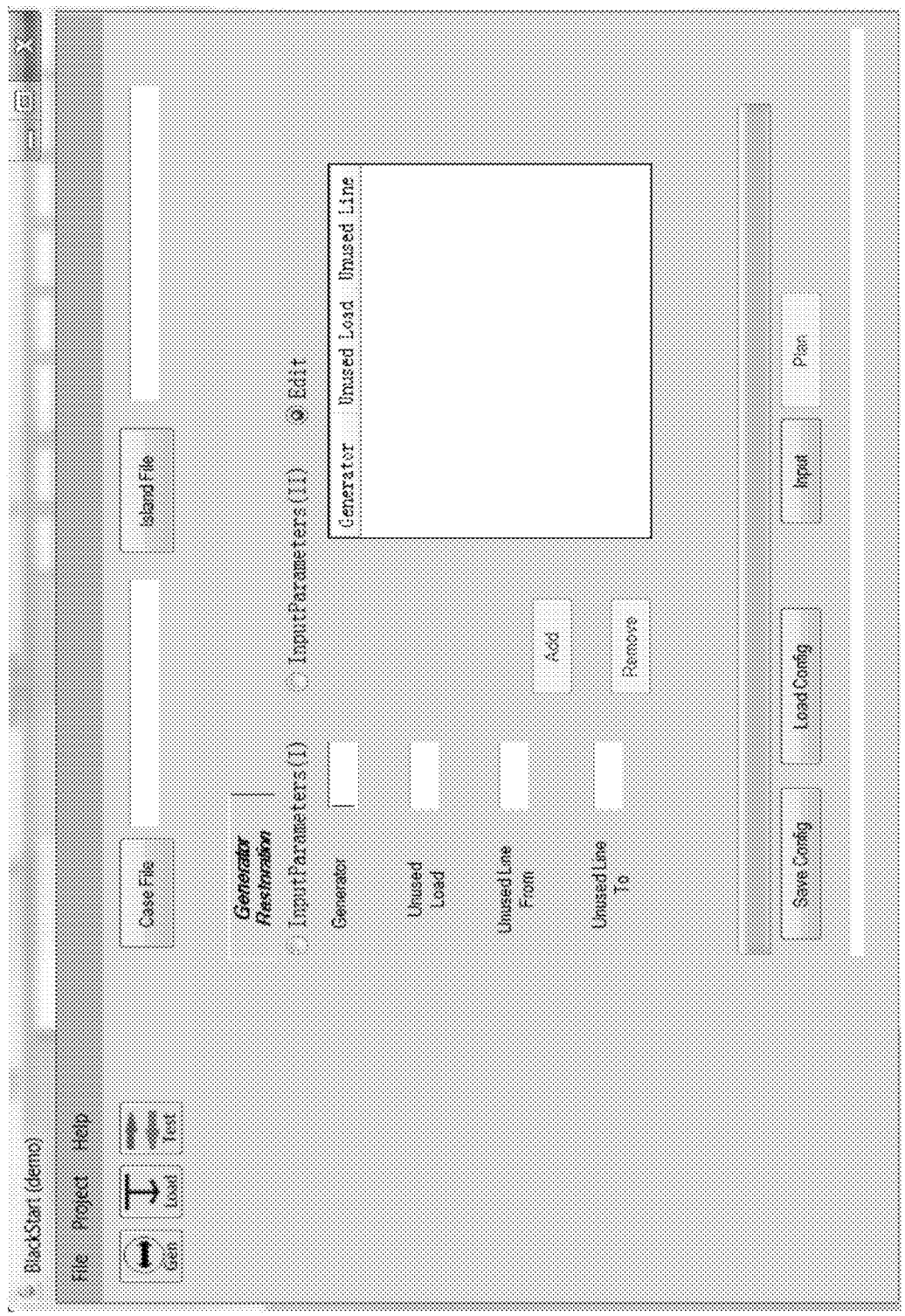
Figure 11D:
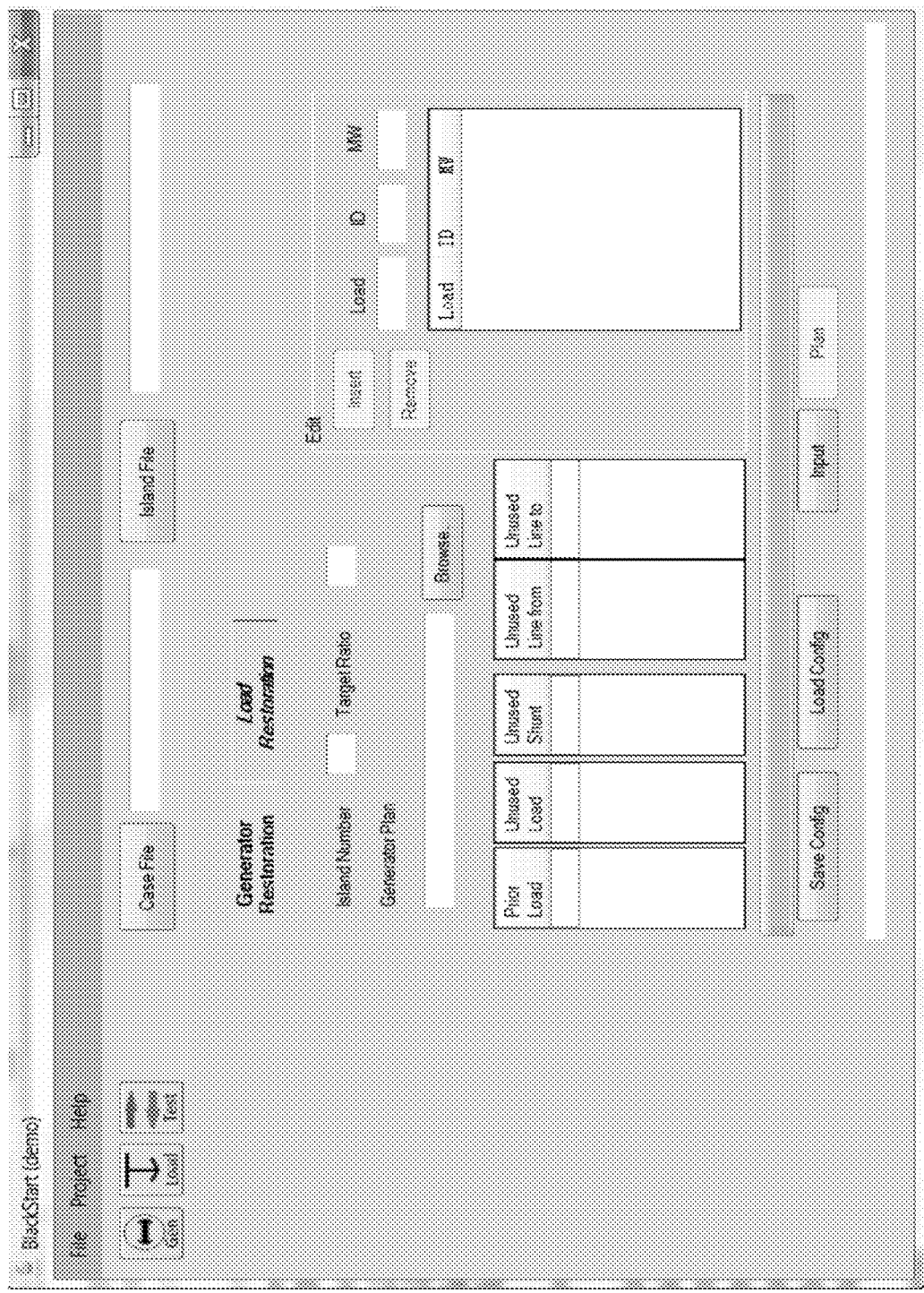

In FIG. 11C, screenshot 1106 shows tabs, buttons, or entry windows to enter various input parameters to the power restoration simulation software. For example, the input parameters may correspond to the following examples:

Generator i|Unused Load j: unavailable/unused load j when energizing generator i Generator i|Unused Line j: unavailable/unused line j when energizing generator i In FIG. 11D, screenshot 1108 shows tabs, buttons, or entry windows to enter various input parameters for load restoration operations of the power restoration simulation software. For example, the input parameters may correspond to the following examples:

Island Number: the island number for load restoration

Target Ratio: target ratio of load to be restored

Generator Plan: a successful generator restoration plan

Prior Load (optional): important loads prior to be restored

Unused Load/Shunt/Line (optional): same as generator restoration

Figure 11E:
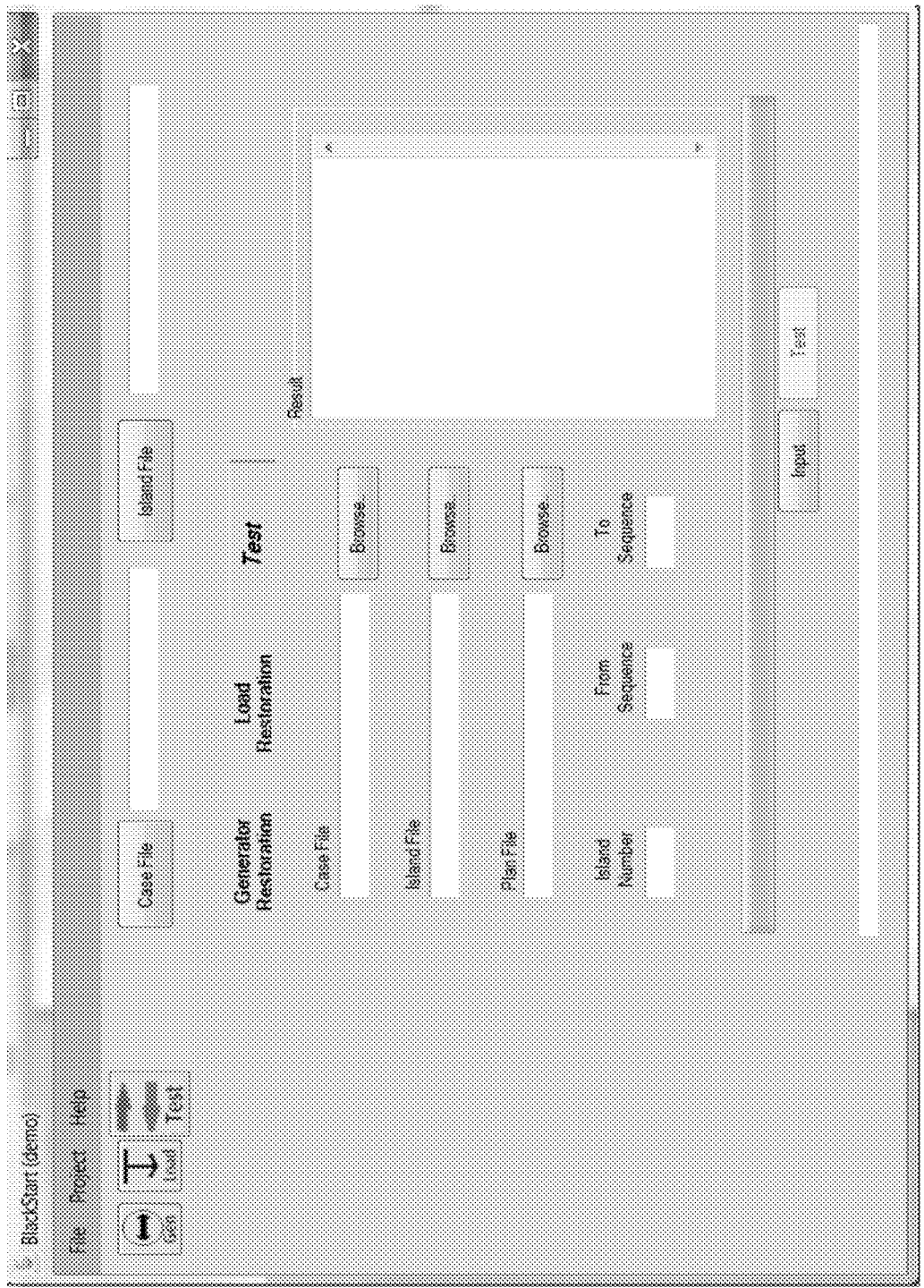

Load/ID/MW (optional): modify the real power demand at the specific load bus to be restored Save Config (optional): save input parameters as a configure file Load Config (optional): load a configure file In FIG. 11E, screenshot 1108 shows tabs, buttons, or entry windows to enter various input parameters for plan testing operations of the power restoration simulation software. For example, the input parameters may correspond to the following examples:

Case File: same as Open File

Island File: same as Open File

Plan File: generator/load/island restoration plan

Island Number: the island number for plan test

Test From/To Sequence (optional): test part of the plan

Figure 12:
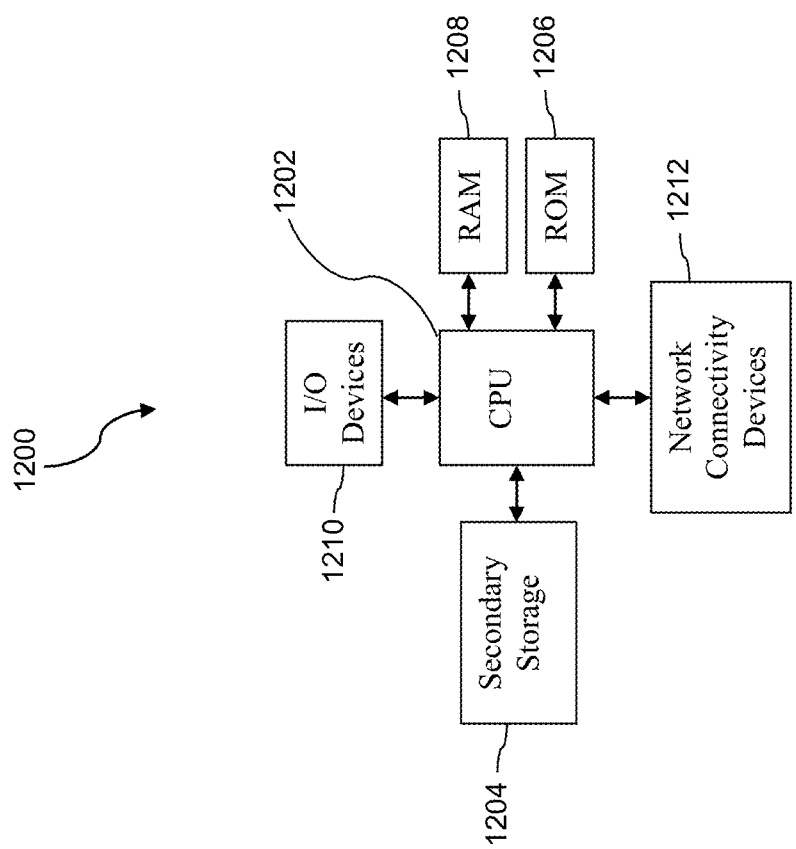
FIG. 12 shows components of a computer system in accordance with embodiments of the disclosure.

FIG. 12 shows components of a computer system 1200 in accordance with embodiments of the disclosure. The computer system 1200 may perform various operations to support the power restoration simulation and planning techniques described herein. The computer system 1200 may correspond to components of the computer system 200, or the server 300 described herein.

As shown, the computer system 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips.

It is understood that by programming and/or loading executable instructions onto the computer system 1200, at least one of the CPU 1202, the RAM 1208, and the ROM 1206 are changed, transforming the computer system 1200 in part into a particular machine or apparatus having the novel functionality taught by the present disclosure. In the electrical engineering and software engineering arts functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1204 may be comprised of one or more disk drives or tape drives and is used for non-volatile storage of data and as an over-flow data storage device if RAM 1208 is not large enough to hold all working data. Secondary storage 1204 may be used to store programs which are loaded into RAM 1208 when such programs are selected for execution. The ROM 1206 is used to store instructions and perhaps data which are read during program execution. ROM 1206 is a non-volatile memory device which typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204. The secondary storage 1204, the RAM 1208, and/or the ROM 1206 may be referred to in some contexts as computer readable storage media and/or non-transitory computer readable media.

I/O devices 1210 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1212 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1212 may enable the processor 1202 to communicate with the Internet or one or more intranets. With such a network connection, it is contemplated that the processor 1202 might receive information from the network, or might output information to the network in the course of performing the above-described method steps. Such information, which is often represented as a sequence of instructions to be executed using processor 1202, may be received from and outputted to the network, for example, in the form of a computer data signal embodied in a carrier wave.

Such information, which may include data or instructions to be executed using processor 1202 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods known to one skilled in the art. The baseband signal and/or signal embedded in the carrier wave may be referred to in some contexts as a transitory signal.

The processor 1202 executes instructions, codes, computer programs, scripts which it accesses from hard disk, floppy disk, optical disk (these various disk based systems may all be considered secondary storage 1204), ROM 1206, RAM 1208, or the network connectivity devices 1212. While only one processor 1202 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1204, for example, hard drives, floppy disks, optical disks, and/or other device, the ROM 1206, and/or the RAM 1208 may be referred to in some contexts as non-transitory instructions and/or non-transitory information.

In an embodiment, the computer system 1200 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1200 to provide the functionality of a number of servers that is not directly bound to the number of computers in the computer system 1200. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the power restoration simulation and planning techniques disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1200, at least portions of the contents of the computer program product to the secondary storage 1204, to the ROM 1206, to the RAM 1208, and/or to other non-volatile memory and volatile memory of the computer system 1200. The processor 1202 may process the executable instructions and/or data structures in part by directly accessing the computer program product, for example by reading from a CD-ROM disk inserted into a disk drive peripheral of the computer system 1200. Alternatively, the processor 1202 may process the executable instructions and/or data structures by remotely accessing the computer program product, for example by downloading the executable instructions and/or data structures from a remote server through the network connectivity devices 1212. The computer program product may comprise instructions that promote the loading and/or copying of data, data structures, files, and/or executable instructions to the secondary storage 1204, to the ROM 1206, to the RAM 1208, and/or to other non-volatile memory and volatile memory of the computer system 1200.

In some contexts, the secondary storage 1204, the ROM 1206, and the RAM 1208 may be referred to as a non-transitory computer readable medium or a computer readable storage media. A dynamic RAM embodiment of the RAM 1208, likewise, may be referred to as a non-transitory computer readable medium in that while the dynamic RAM receives electrical power and is operated in accordance with its design, for example during a period of time during which the computer 1200 is turned on and operational, the dynamic RAM stores information that is written to it. Similarly, the processor 1202 may comprise an internal RAM, an internal ROM, a cache memory, and/or other internal non-transitory storage blocks, sections, or components that may be referred to in some contexts as non-transitory computer readable media or computer readable storage media.

In some examples, a non-transitory computer-readable storage medium may store a program or instructions that cause the processor 1202 to receive an input file with parameters representing a power grid system. Further, a non-transitory computer-readable storage medium may store a program or instructions that cause the processor 1202 to simulate restoration of the power grid system based on the parameters and based on a set of power restoration algorithms. For example, the program or instructions, when executed, may cause the processor 1202 to simulate restoration of the power grid system based on a sectionalizing algorithm that divides the power grid system into a plurality of sections based on a system topology, generator locations, load locations, and a total number of requested sections, and restores power to at least some of the plurality of sections in parallel. Further, the program or instructions, when executed, may cause the processor 1202 to simulate restoration of the power grid system based on a synchronization algorithm that reconnects energized sections of the power grid system. Further, the program or instructions, when executed, may cause the processor 1202 to simulate restoration of the power grid system based on a non-black-start (NBS) generator start-up sequencing algorithm that simulates load restoration for each NBS generator of the power grid system based on a load identification algorithm and a sequence number for each of the NBS generators. Further, the program or instructions, when executed, may cause the processor 1202 to simulate restoration of the power grid system by determining all possible transmission paths between an NBS generator to be energized and corresponding loads identified by the load identification algorithm, and selecting one of the possible transmission paths. Further, a non-transitory computer-readable storage medium may store a program or instructions that cause the processor 1202 to generate a restoration plan for the power grid system based on the simulation. Further, a non-transitory computer-readable storage medium may store a program or instructions that cause the processor 1202 to test a generated restoration plan and, if the restoration plan is feasible, to display the restoration plan.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Without limitation to other embodiments, various concepts are described herein including the following:

1. Separation concept for large scale power system restoration: This concept is to separate the automated power system restoration planning into four processes: sectionalization, generator restoration, load restoration and synchronization. The objective for sectionalization is to identify subsystems of entire power system so that the restoration can be carried out in parallel. The objective for generator restoration is to energize generators in the subsystem as many as possible. The objective for load restoration is to restore loads in the subsystem to a target radio after generators have been energized. The objective for synchronization is to integrate all subsystems that are already energized after parallel restoration.
2. Method of creating adjacency matrix: This concept is that the generator restoration process and load restoration process comprises using the adjacency matrix (i.e., a Y-matrix in power system analysis) to describe power system network topology. The adjacency matrix is created by replacing each non-zero entry in the admittance matrix with one (1), all other entries in the admittance matrix are zeros (0). The creation of adjacency matrix is to simplify and expedite the path finding effect.
3. Character inversion concept of load: This concept is to change the tradition role of a load: instead of being serviced by the generators, the load serves generator of interest with desired amount balancing energy according to the minimum output requirement of generator or the output level desired by power system operators. The generator restoration process comprises energizing loads at the same sequence as energizing generators to maintain power balance. The loads energized by the generator restoration algorithm have the same real power demand as the output of energized generator. The loads are defined as target loads in the generator restoration process.
4. Method of creating reachable matrix: This concept is to use a reachable matrix to search target loads. The reachable matrix is used to determine whether one load can be reached by a path from a generator within a certain step. The entries in the reachable matrix are either one (can be reached) or zero (cannot be reached). The reachable matrix is computed from the adjacency matrix.
5. Method of use load ratio: This concept is to use a ratio of peak real power demand at target loads in the generator restoration process.
6. Concept of electrical distance (ED): This concept is that ED can be the Absolute Electrical Distance (AED), i.e. equivalent impedance between two buses under consideration during the restoration process. ED can also be the Relative Electrical Distance (RED) between two buses under consideration during the restoration process, which is derived and normalized based on the impedance and AED.
7. Method for computation of ED: This concept is that ED is computed using generation shift factor, power transfer distribution factor, and line impedance (in P.U.).
8. Method for target load search: This concept is for the load identification algorithm to use the following criteria for selecting target loads: 1) the sum of real power demand of target loads equals to the real power output of generator; 2) for energizing black-start units, small loads are higher priority for selection as the target loads; 3) for energizing a non-black-start unit, large loads are higher priority for selection as the target loads; and 4) loads with small relative electrical distance (RED) to the grid equivalent generator are higher priority for selection as the target loads.
9. Criteria for generator start-up sequencing: This concept is that the generator restoration process comprises a generator start-up sequencing algorithm using criteria for determining generator energizing sequence: 1) generators with less steps of connection to the black-start units are prior to be energized 2) generators with larger minimum output requirement are prior to be energized 3) black-start units are energized at the first sequence 4) nuclear generators are energized at the last sequence.
10. Branch restoration maximization criteria: This concept is that during the load restoration process all transmission lines connecting to the loads which are reached within three steps from any energized buses are energized in order to maximize the number of energized branches. Thus, more branches are energized.
11. Stabilization method: This concept is that during the load restoration process the output of energized generators is adjusted when energizing loads to stabilize the portion of power system that has already been energized.
12. Method for hybrid path search: This concept is that the generator restoration process and load restoration process comprise a hybrid path search algorithm by jointly using depth-first search, breadth-first search and Dijkstra's search as suggested by this method claimed.
13. Probabilistic path selection method: This concept is that the generator restoration process comprises a probabilistic path selection algorithm used to derive the wining probability distribution of transmission lines based on ED, RED, AED, and generation shift factor, power transfer distribution factor and line impedance. The path with high wining probability will be considered first.

14. Random path selection method: This concept is that the load restoration process comprises a randomized path selection algorithm to choose the transmission path.
15. Method for operating shunt capacitance in restoration: This concept is that the generator restoration process and load restoration process comprise the opening or closing shunts automatically executed in the same sequence.
16. Method for selecting reference bus: This concept is that the generator restoration process and load restoration process comprise automatically selecting the reference bus.
17. Method for selecting and energizing transmission lines: This concept is that for the generator restoration process and the load restoration process, a transmission line can be energized only if it has at least one terminal already energized.
18. Method for selecting and energizing generator and load: This concept is that a generator or load can be energized only if the transmission lines connected to them have been already energized.
19. Criteria for sectionalization: This concept is to create a number of subsystems for parallel restoration by taking into consideration the following: 1) each subsystem must have at least one black-start generator, 2) each subsystem should match generation and load to maintain system frequency within prescribed limits, 3) each subsystem should have adequate voltage control capabilities to maintain a suitable voltage profile, 4) each subsystem should be monitored at the system control center to ensure its internal security.
20. Criteria of synchronization: This concept is to integrate the subsystems that are already energized after parallel restoration by taking into consideration of following: 1) selecting the one with the larger generation capacity as the reference bus from the reference buses of two subsystems to be connected, 2) selecting the one which yields the minimal change of generation as the new reference bus if the generation capacity of reference buses are the same, 3) selecting the one with less impact on voltage profile from all possible interconnection lines.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system, comprising:
a processor;
a storage device coupled to the processor and storing a program that, when executed, causes the processor to simulate restoration of a power grid system based on a generator start-up sequencing algorithm and to generate a restoration plan for the power grid system based on the simulation,
wherein the generator start-up sequencing algorithm accounts for black-start (BS) generators and non-black-start (NBS) generators, and
wherein the generator start-up sequencing algorithm varies a start-up sequence for NBS generators based on a distance to BS generator criteria or a capacity criteria.

2. The computer system of claim 1, wherein the program, when executed, causes the processor to simulate restoration of the power grid system by sectionalizing the power grid system and restoring power to sections of the power grid system in parallel.

3. The computer system of claim 2, wherein the program, when executed, causes the processor to perform said sectionalizing based on a system topology, generator locations, load locations, and a total number of requested sections, and wherein said sectionalizing results in a bus list for each section of the power grid system.

4. The computer system of claim 2, wherein the program, when executed, further causes the processor to simulate restoration of the power grid system by synchronizing restoration of power to sections of the power grid system.

5. The computer system of claim 1, wherein the program, when executed, further causes the processor to simulate load restoration for each generator of the power grid system to maintain power balance based on a load identification algorithm.

6. The computer system of claim 5, wherein the program, when executed, further causes the processor to simulate restoration of the power grid system by determining all possible transmission paths between a generator to be energized and corresponding identified loads by a path search algorithm, and selecting one of the possible transmission paths identified by the path selection algorithm.

7. The computer system of claim 1, wherein the program, when executed, further causes the processor to test the restoration plan and, if the restoration plan is feasible, to display the restoration plan and, if the restoration plan is unfeasible, to adjust input parameters and generate another restoration plan automatically.

8. The computer system of claim 1, wherein the program, when executed, further causes the processor to simulate restoration of the power grid system based on an input file that defines a set of buses, generators, loads, shunts, and branches.

9. A non-transitory computer-readable medium storing a program that, when executed, causes a processor to:
receive an input file with parameters representing a power grid system;
simulate restoration of the power grid system based on the parameters and based on a set of power restoration algorithms including a generator start-up sequencing algorithm,
wherein the generator start-up sequencing algorithm accounts for black-start (BS) generators and non-black-start (NBS) generators, and
wherein the generator start-up sequencing algorithm varies a start-up sequence for NBS generators based on a distance to BS generator criteria or a capacity criteria; and
generate a restoration plan for the power grid system based on the simulation.

10. The non-transitory computer-readable medium of claim 9, wherein the program, when executed, causes a processor to simulate restoration of the power grid system based on a sectionalizing algorithm that divides the power grid system into a plurality of sections based on a system topology, generator locations, load locations, and a total number of requested sections, and restores power to at least some of the plurality of sections in parallel.

11. The non-transitory computer-readable medium of claim 9, wherein the program, when executed, causes the processor to simulate restoration of the power grid system based on a synchronization algorithm that integrates energized sections of the power system to an entire system by energizing interconnection branches.

12. The non-transitory computer-readable medium of claim 9, wherein the program, when executed, causes the processor to simulate restoration of the power grid system based on the generator start-up sequencing algorithm and to simulate load restoration for each generator of the power grid system to maintain power balance based on a load identification algorithm.

13. The non-transitory computer-readable medium of claim 12, wherein the program, when executed, causes the processor to simulate restoration of the power grid system by determining all possible transmission paths between a generator to be energized and corresponding identified loads by the load identification algorithm, and selecting one of the possible transmission paths using a path selection algorithm.

14. A method, comprising:
receiving, by a processor, an input file with parameters representing a power grid system;
simulating, by the processor, restoration of the power grid system based on the parameters and a set of power restoration algorithms including a generator start-up sequencing algorithm,
wherein the generator start-up sequencing algorithm accounts for black-start (BS) generators and non-black-start (NBS) generators, and
wherein the generator start-up sequencing algorithm varies a start-up sequence for NBS generators based on a distance to BS generator criteria or a capacity criteria; and
generating, by the processor, a restoration plan for the power grid system based on the simulation.

15. The method of claim 14, wherein simulating restoration of the power grid system comprises sectionalizing the power grid system based on a sectionalizing algorithm that divides the power grid system into a plurality of sections based on a system topology, generator locations, load locations, and a total number of requested sections.

16. The method of claim 14, wherein simulating restoration of the power grid system comprises a synchronization algorithm that integrates energized sections of the power system to an entire system by energizing interconnection branches.

17. The method of claim 14, wherein simulating restoration of the power grid system comprises applying the generator start-up sequencing algorithm to obtain a generator restoration order and applying a load identification algorithm to restore loads for each generator of the power grid system for power balance.

18. The method of claim 17, further comprising using information from an admittance matrix to select possible transmission paths between a generator to be energized and the corresponding identified loads without violation, wherein the admittance matrix characterizes the power system grid as a structure with transmission line impedance, power transfer distribution factors, line outage distribution factor, shunts and transformers.

19. The method of claim 18, further comprising relying on a probabilistic measure computed by information extracted from the admittance matrix to reduce a selection space of choosing a final transmission path for both generator restoration and load restoration.

* * * * *